(12) United States Patent
Jia et al.

(10) Patent No.: US 12,645,683 B2
(45) Date of Patent: Jun. 2, 2026

(54) COMPUTER SYSTEMS AND METHODS FOR WATCHLIST SCREENING

(71) Applicant: Capital One Financial Corporation, McLean, VA (US)

(72) Inventors: Weiyi Jia, Buffalo Grove, IL (US); Xiaochen Zhang, Frederick, MD (US); Fang Bai, Buffalo Grove, IL (US); Ahreum Amy Han Park, Phoenix, AZ (US); Chakradhar Yedurupaka, Georgetown, TX (US); Dong Yan, Buffalo Grove, IL (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 18/583,391

(22) Filed: Feb. 21, 2024

(65) Prior Publication Data

US 2025/0265255 A1 Aug. 21, 2025

(51) Int. Cl.
| | |
|---|---|
| *G06F 16/2457* | (2019.01) |
| *G06F 16/25* | (2019.01) |
| *G06Q 40/02* | (2023.01) |

(52) U.S. Cl.
CPC ...... *G06F 16/24578* (2019.01); *G06F 16/258* (2019.01); *G06Q 40/02* (2013.01)

(58) Field of Classification Search
CPC .. G06F 16/24578; G06F 16/258; G06Q 40/02
See application file for complete search history.

(56) References Cited

U.S. PATENT DOCUMENTS

| | | | | |
|---|---|---|---|---|
| 9,292,797 | B2 | 3/2016 | He et al. | |
| 10,838,987 | B1 * | 11/2020 | Edwards | G06F 16/288 |
| 11,263,703 | B2 * | 3/2022 | Juban | G06Q 20/401 |
| 11,501,067 | B1 * | 11/2022 | Naghshnejad | G06F 40/284 |
| 2018/0293483 | A1 * | 10/2018 | Abramson | H04L 51/02 |
| 2020/0099718 | A1 * | 3/2020 | Li | G06F 21/56 |
| 2022/0377107 | A1 | 11/2022 | Lee et al. | |

OTHER PUBLICATIONS

Muños, Eduardo. Getting started with NLP: Tokenization, Document-Term Matrix, TF-IDF. Analytics Vidhya. Aug. 3, 2020, 13 pages.

(Continued)

*Primary Examiner* — Jay A Morrison
(74) *Attorney, Agent, or Firm* — Lee Sullivan Shea & Smith LLP

(57) ABSTRACT

A computing platform is configured to (i) obtain a first set of watchlist data entries for parties that appear on one or more watchlists and a second set of screened data entries for parties that are to be screened against the one or more watchlists; (ii) determine an initial set of candidate matches between screened data entries and watchlist data entries using a first comparison technique (e.g., a comparison technique that utilizes similarity scores of a first type), and (iii) determine a narrowed set of candidate matches between screened data entries and watchlist data entries using a second comparison technique (e.g., a comparison technique that utilizes similarity scores of a second type).

19 Claims, 9 Drawing Sheets

(56)                         References Cited

OTHER PUBLICATIONS

Gorny, Thorsten J. The Problem of Name Matching in Sanctions Screening. Sanctions Lists & PEP Screening for AML Compliance. Jul. 19, 2022, 7 pages.

Singh, Rohit. Data Augmentation by Synonym Replacement. 2020, 25 pages, available at https://www.kaggle.com/code/rohitsingh9990/data-augmentation-by-synonym-replacement.

Tatman, Rachael. Stopword Lists for 19 Languages. 2017, 24 pages, available at https://www.kaggle.com/datasets/rtatman/stopword-lists-for-19-languages?select=englishST.txt.

* cited by examiner

100

BACK-END COMPUTING PLATFORM 102

CLIENT DEVICES 106

DATA SOURCES 104

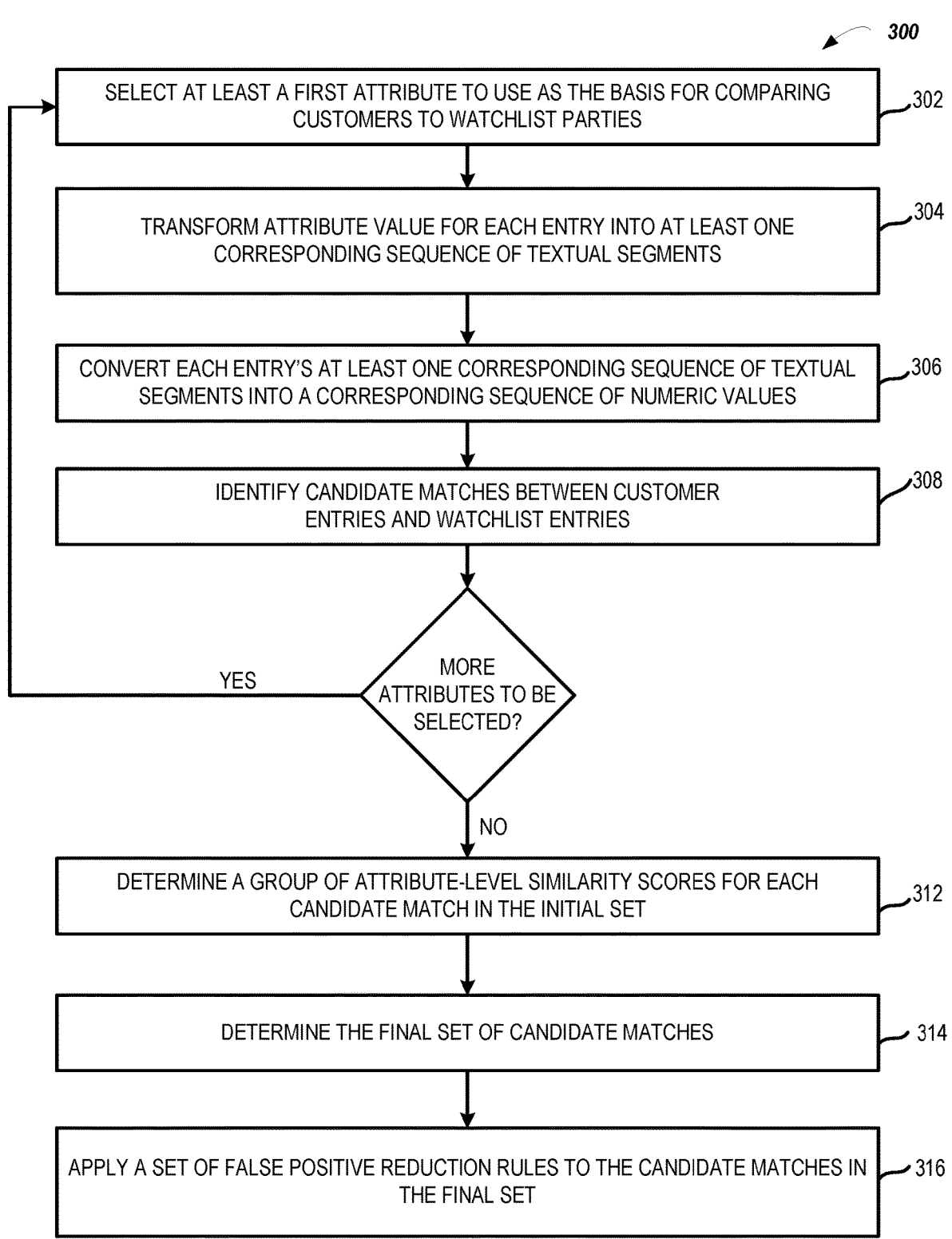

*300*

SELECT AT LEAST A FIRST ATTRIBUTE TO USE AS THE BASIS FOR COMPARING CUSTOMERS TO WATCHLIST PARTIES —302

TRANSFORM ATTRIBUTE VALUE FOR EACH ENTRY INTO AT LEAST ONE CORRESPONDING SEQUENCE OF TEXTUAL SEGMENTS —304

CONVERT EACH ENTRY'S AT LEAST ONE CORRESPONDING SEQUENCE OF TEXTUAL SEGMENTS INTO A CORRESPONDING SEQUENCE OF NUMERIC VALUES —306

IDENTIFY CANDIDATE MATCHES BETWEEN CUSTOMER ENTRIES AND WATCHLIST ENTRIES —308

MORE ATTRIBUTES TO BE SELECTED?    YES

NO

DETERMINE A GROUP OF ATTRIBUTE-LEVEL SIMILARITY SCORES FOR EACH CANDIDATE MATCH IN THE INITIAL SET —312

DETERMINE THE FINAL SET OF CANDIDATE MATCHES —314

APPLY A SET OF FALSE POSITIVE REDUCTION RULES TO THE CANDIDATE MATCHES IN THE FINAL SET —316

| Watchlist ID | Watchlist Name |
|---|---|
| 1 | Tom h Parker |
| 2 | Tomy Parker |
| 3 | Josephine h Don |
| 4 | Joseph Don |
| 5 | John Kelly |
| 6 | John Kelly |
| 7 | John h Kelly |
| 8 | John Kelly |
| 9 | John e Kelly |
| 10 | Johny Kelly |

420

421

| Watchlist ID | Watchlist Name |
|---|---|
| 1 | {Tom, Parker} |
| 2 | {Tomy, Parker} |
| 3 | {Josephine, Don} |
| 4 | {Joseph, Don} |
| 5 | {John, Kelly} |
| 6 | {John, Kelly} |
| 7 | {John, Kelly} |
| 8 | {John, Kelly} |
| 9 | {John, Kelly} |
| 10 | {Johny, Kelly} |

430

431  432

| Watchlist Name | don | john | johny | joseph | josephine | kelly | parker | tom | tomy |
|---|---|---|---|---|---|---|---|---|---|
| | | | | | Textual Segment | | | | |
| Tom h Parker | 0 | 0 | 0 | 0 | 0 | 0 | 0.647689 | 0.761905 | 0 |
| Tomy Parker | 0 | 0 | 0 | 0 | 0 | 0 | 0.647689 | 0 | 0.761905 |
| Josephine h Don | 0.647689 | 0 | 0 | 0 | 0.761905 | 0 | 0 | 0 | 0 |
| Joseph Don | 0.647689 | 0 | 0 | 0.761905 | 0 | 0 | 0 | 0 | 0 |
| John Kelly | 0 | 0.741808 | 0 | 0 | 0 | 0.670612 | 0 | 0 | 0 |
| John Kelly | 0 | 0.741808 | 0 | 0 | 0 | 0.670612 | 0 | 0 | 0 |
| John h Kelly | 0 | 0.741808 | 0 | 0 | 0 | 0.670612 | 0 | 0 | 0 |
| John Kelly | 0 | 0.741808 | 0 | 0 | 0 | 0.670612 | 0 | 0 | 0 |
| John e Kelly | 0 | 0.741808 | 0 | 0 | 0 | 0.670612 | 0 | 0 | 0 |
| Johny Kelly | 0 | 0 | 0.881071 | 0 | 0 | 0.472984 | 0 | 0 | 0 |

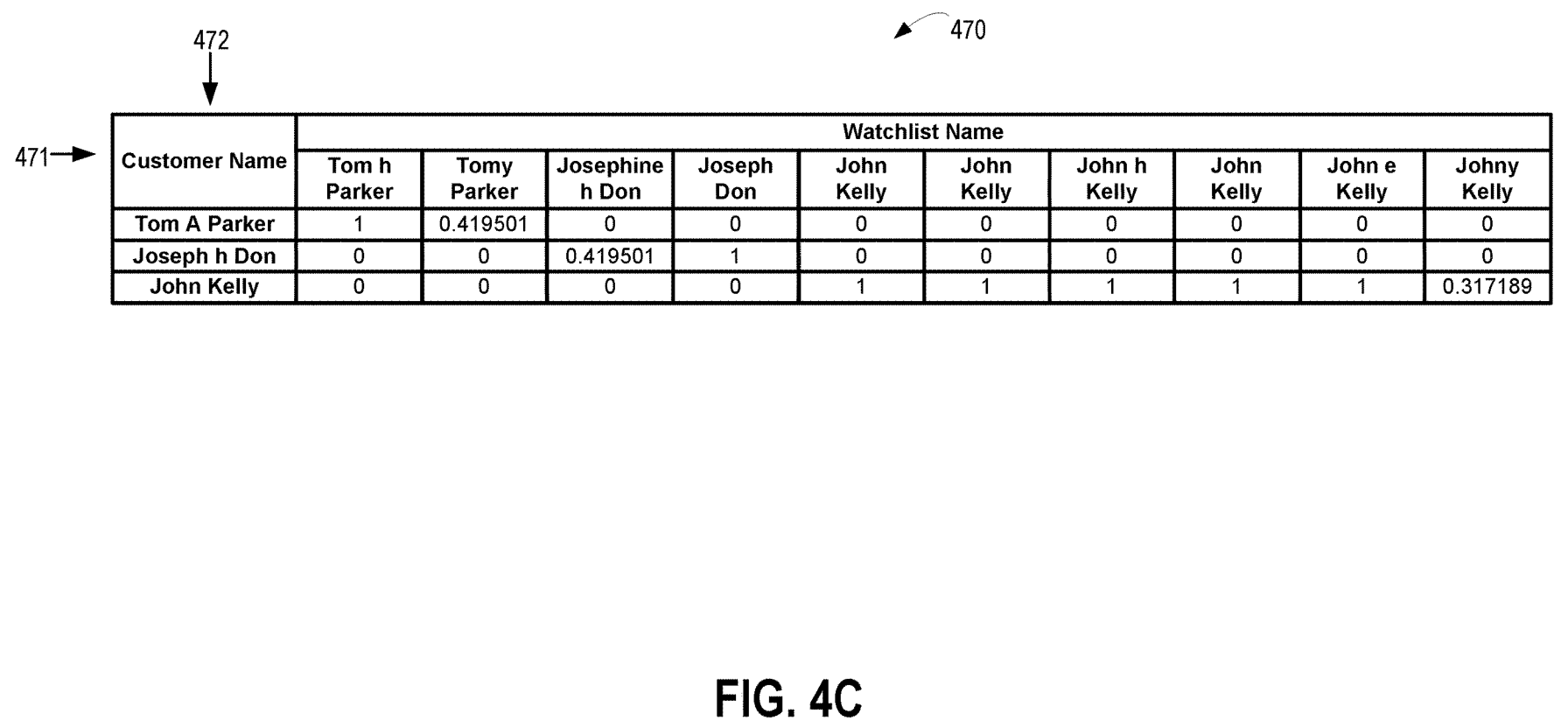

| Customer Name | Tom h Parker | Tomy Parker | Josephine h Don | Joseph Don | John Kelly | John Kelly | John h Kelly | John Kelly | John e Kelly | Johny Kelly |
|---|---|---|---|---|---|---|---|---|---|---|
| | | | | | | Watchlist Name | | | | |
| Tom A Parker | 1 | 0.419501 | 0 | 0 | 0 | 0 | 0 | 0 | 0 | 0 |
| Joseph h Don | 0 | 0 | 0.419501 | 1 | 0 | 0 | 0 | 0 | 0 | 0 |
| John Kelly | 0 | 0 | 0 | 0 | 1 | 1 | 1 | 1 | 1 | 0.317189 |

FIG. 4C

COMPUTER SYSTEMS AND METHODS FOR WATCHLIST SCREENING

BACKGROUND

Watchlist screening technologies are designed to flag parties (or transactions involving parties) that appear on government or industry watchlists. These watchlists generally contain names of parties associated with prohibited activities such as financial crimes, terrorism, or other illegal activities. Watchlist screening enhances security, compliance, and risk management across various industries.

OVERVIEW

Disclosed herein is new software technology for performing watchlist screening with increased accuracy, efficiency, and/or adaptability.

In one aspect, the disclosed technology may take the form of a method to be carried out by a computing platform that involves (a) obtaining (i) a first set of watchlist data entries for parties that appear on one or more watchlists and (ii) a second set of screened data entries for parties that are to be screened against the one or more watchlists; (b) determining an initial set of candidate matches between screened data entries and watchlist data entries by: (i) transforming a respective attribute value of each watchlist data entry in the first set and each screened data entry in the second set into a respective sequence of textual segments that represents the respective attribute value; (ii) converting the respective sequence of textual segments for each watchlist data entry in the first set and each screened data entry in the second set into a corresponding sequence of numeric values; (iii) for each respective pairing of a respective screened data entry and a respective watchlist data entry in a set of possible pairings between screened data entries and watchlist data entries, determining a respective similarity score of a first type for the respective pairing based on a comparison between the corresponding sequence of numeric values for the respective screened data entry and the corresponding sequence of numeric values for the respective watchlist data entry; and (iv) based on the respective similarity scores of the first type that are determined for the respective pairings in the set of possible pairings, determining a subset of respective pairings to include in the initial set of candidate matches; and (c) determining a narrowed set of candidate matches between screened data entries and watchlist data entries by: (i) for each respective candidate match in the initial set, determining a respective group of attribute-level similarity scores of a second type; and (ii) based on the respective groups of attribute-level similarity scores of the second type that are determined for the candidate matches in the initial set, determining a subset of candidate matches to include in the narrowed set of candidate matches.

In some examples, the method carried out by the computing platform further involves validating whether the narrowed set of candidate matches are true matches.

Further, in some examples, validating whether the narrowed set of candidate matches are true matches involves validating whether given ones of candidate matches in the narrowed set are true matches based on user input provided by one or more analysts that are presented with the given ones of the candidate matches in the narrowed set.

Still further, in some examples, the method carried out by the computing platform further involves, based on validating that a given candidate match in the narrowed set is a true match, causing a screened party associated with the given candidate match to be from to be precluded from performing a task.

Still further, in some examples, the similarity score of the first type comprises a similarity score determined using cosine similarity.

Still further, in some examples, the attribute-level similarity scores of the second type comprise attribute-level similarity scores determined using edit distance.

Still further, in some examples, determining the subset of candidate matches to include in the narrowed set of candidate matches based on the respective groups of attribute-level similarity scores of the second type that are determined for the candidate matches in the initial set involves: (a) for each candidate match in the initial set, inputting the respective group of attribute-level similarity scores of the second type into a machine learning model that is configured to predict a likelihood of match between a screened data entry and a watchlist data entry and thereby determined a respective likelihood of match for the candidate match; and (b) based on the respective likelihoods of match that are determined for the candidate matches in the initial set, determining the subset of candidate matches to include in the narrowed set of candidate matches.

Still further, in some examples, the respective attribute value comprises a respective name value.

Still further, in some examples, the respective group of attribute-level similarity scores of the second type determined for each respective candidate match in the initial set comprises a respective group of attribute-level similarity scores of the second type that reflect a similarity between a group of attribute values for a screened party and a corresponding group of attribute values for a watchlist party.

Still further, in some examples, the numeric values comprise Term Frequency-Inverse Document Frequency (TF-IDF) values.

In yet another aspect, disclosed herein is a computing platform that includes a communication interface for communicating over at least one data network, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing method.

In still another aspect, disclosed herein is a non-transitory computer-readable medium provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 3 depicts a possible embodiment of match-identification functionality that may be carried out in accordance with the disclosed software technology for watchlist screening.

FIGS. 4A-C illustrate a simplified example of how an initial set of candidate matches may be identified in accordance with a first phase of the disclosed software technology.

DETAILED DESCRIPTION

Figure 1:
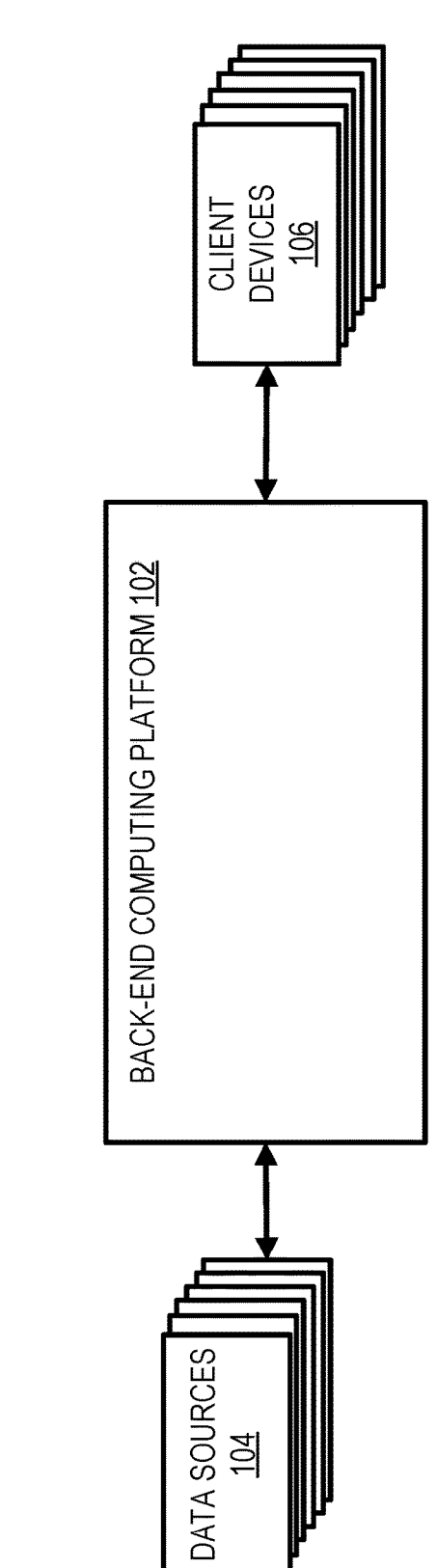
FIG. 1 depicts an example network environment in which aspects of the disclosed software technology for watchlist screening can be implemented.

Financial crimes such as money laundering, fraud, and terrorism financing do a great deal of harm to both individuals and societies. Data from the Federal Trade Commission (FTC), for example, demonstrates that billions of U.S. dollars (USD) are lost annually as a result of financial crimes. However, the harm that financial crimes inflict upon victims transcends measurement by currency value alone. A single fraudulent actor, for example, can eviscerate the life savings of victims whose trust has been betrayed, thereby robbing the victims of not only their means for sustenance, but also of their peace of mind and their capacity for trust. When people who control large corporations, institutions, and governments commit financial crimes, the consequences can be even more widespread. Financial institutions may be pushed into bankruptcy, organized crime syndicates may be empowered, terrorist organizations may be strengthened, national financial systems may be pushed to the brink of collapse, and governments may be destabilized.

Given the existential threat that financial crimes pose to people and institutions, governments throughout the world have enacted laws both to punish perpetrators who commit financial crimes and to establish regulations that prevent such financial crimes from being committed in the first place. One approach that many government agencies and regulatory bodies have implemented to prevent financial crimes involves creating watchlists of parties who are suspected of being involved in illicit activities that involve financial transactions (e.g., money laundering, fraud, embezzlement, drug trafficking, human trafficking, tax evasion, cybercrime, terrorist financing, insider trading, bribery, extortion, etc.). With the United States, agencies such as the Financial Action Task Force (FATF) and the Office of Foreign Assets Control (OFAC) typically maintain such watchlists. Similar agencies in other countries also maintain watchlists. Some financial institutions may also create their own internal watchlists based on internal policies designed to facilitate risk assessment and compliance.

Depending on the purpose a given watchlist serves, the criteria for inclusion in the watchlist may vary. Watchlists that are created to facilitate compliance with sanctions, for example, may comprise lists of countries against whom sanctions have been effected due to geopolitical concerns or violations of international treaties. In another example, watchlists that are designed to prevent financial institutions from facilitating transactions initiated by criminal entities may include lists of entities who are suspected of being involved in criminal activities (e.g., as a result of evidence that has been gathered by law enforcement personnel).

In many instances, agencies enact regulations that accompany the watchlists those agencies maintain. Such regulations may, for example, mandate that entities found on the watchlists not be allowed to complete certain types of transactions. Furthermore, such regulations may impose fines and penalties for non-compliance. Thus, a failure to comply with regulations associated with watchlists may prove to be costly—even if the failure to comply did not proximately cause losses resulting from a criminal action.

In the United States, financial institutions are legally obligated to comply with anti-money laundering (AML) and counter-terrorism financing (CTF) regulations that prohibit allowing entities included on corresponding watchlists from completing certain types of transactions. Therefore, financial institutions perform watchlist screening at the outset of certain types of transactions to detect whether any of the transacting parties (e.g., payors or payees) match any entity included in any applicable watchlist. If a match for any of the transacting parties is detected, the financial institution can prevent the transaction from being completed. In this manner, financial institutions can stifle attempts to commit financial crimes and other illegal acts.

Oftentimes, however, determining whether a party matches an entry on a watchlist is not a trivial matter. Many criminals are well aware of how watchlists are used and have evolved increasingly sophisticated strategies to avoid watchlist match detection. Criminals can defeat naïve approaches for watchlist matching (e.g., such as those that conclude two entities do not match if any difference is detected) easily by entering identifying data (e.g., names, addresses, etc.) in variant formats. For example, if the name "Katy Dooley" is included in an entry on a watchlist, a naïve approach might fail to flag entry that include variant versions of the name (e.g., "Mrs. Albert Dooley," "K. W. Dooley," etc.) as matches. For this reason, financial institutions generally apply watchlist screening technologies that involve fuzzy matching and other matching techniques that can identify matches that, although inexact, are likely to represent the same entity.

As a practical matter, given the sophisticated strategies that criminals use to avoid being matched to watchlists, financial institutions have little choice but to implement watchlist screening technologies that can detect inexact matches. However, existing watchlist screening technologies that are capable of detecting inexact matches are plagued by a number of drawbacks.

First, existing watchlist screening technologies have high false-positive rates. False positives may cause a financial institution to prevent legitimate transactions from taking place, thereby causing the financial institution to forfeit fees that might have been collected and burdening parties who are falsely flagged. Parties who have been falsely flagged may ultimately choose to seek out services from competitors, thereby causing the financial institution to lose market share. And some cases, falsely flagged parties may even sue the financial institution.

Second, existing investigation processes for verifying whether matches are true positives or false positives are inefficient. Since the consequences of wrongly flagging parties as matches for entities in watchlists can be so severe, a financial institution may be motivated to scrutinize the matches found by existing watchlist screening technologies carefully. This scrutiny, though, may incur costs of its own. For example, a financial institution may be obliged to pay human specialists to inspect matches for verification purposes. Furthermore, the additional actions taken to verify whether matches are true positives may cause certain transactions to be delayed, thereby incentivizing transacting parties not to work through the financial institution for future transactions.

Third, existing watchlist screening technologies are designed to identify matches by comparing attributes individually rather than collectively. As a result, existing watchlist screening technologies may fail to detect that two entries that include many different types of attributes are a match if the similarity of the two entries as a whole is not well reflected by the similarity of their respective values for any single one of those attributes alone.

Fourth, existing watchlist screening technologies lack the capacity to adapt quickly and effectively when the strategies criminals use to avoid being flagged evolve over time. As a result, it may be costly for financial institutions to keep the watchlist screening technologies they utilize up to date. However, the risk of using obsolete watchlist screening technology is very high. For example, once criminals discover that a financial institution's watchlist screening technology is obsolete (e.g., can be defeated consistently by applying a newly developed strategy), criminals may flock to the financial institution en masse to exploit this vulnerability.

The drawbacks of the existing technologies listed above are merely illustrative, as there are other drawbacks and technical problems with existing watchlist screening technologies that impede the ability of financial institutions to perform watchlist screening accurately and efficiently.

To address these and other problems with existing watchlist screening technologies, disclosed herein is new software technology for performing watchlist screening with increased accuracy, efficiency, and/or adaptability, which may be referred to at times herein as a "screening tool." While the examples described herein refer to watchlist screening in the context of financial institutions, the screening tool described herein can be applied to watchlists that are used in many different contexts. In practice, the disclosed screening tool may take the form of a software application that is hosted on a back-end computing platform of a financial institution and is accessible by client devices over a communication path that typically includes the Internet (among other data networks that may be included). In this respect, the disclosed screening tool may comprise server-side software installed on the back-end computing platform as well as client-side software that runs on the client devices and interacts with the server-side software, which could take the form of a client application running in a web browser (sometimes referred to as a "web application"), a native desktop application, or a mobile application, among other possibilities. However, the screening tool could take other forms and/or be implemented in other manners as well.

At a high level, the disclosed screening tool may include functionality for (i) pre-processing data entries for parties that appear on one or more watchlists (which may be referred to herein as "watchlist parties") and parties that are to be screened against the one or more watchlists (which may be referred to herein as "screened parties") so as to prepare such data entries for matching, (ii) determining an initial set of candidate matches between data entries for screened parties and data entries for watchlist parties using a first comparison technique that is generally designed to identify candidate matches in a less time consuming and less computationally intensive (but perhaps overinclusive) manner, (iii) evaluating the candidate matches in the initial set using a second comparison technique that is generally designed to identify candidate matches in a more accurate (but perhaps more time consuming and/or more computationally intensive) manner and thereby determining a final set of candidate matches between data entries for screened parties and data entries for watchlist parties, and (iv) validating the candidate matches in the final set (e.g., based on user input and/or validation rules).

In this way, the disclosed screening tool may improve over existing technologies for watchlist screening in various ways. For instance, the screening tool implements a multi-phased approach that intelligently balances between compute efficiency and accuracy by identifying an initial set of candidate matches using a first comparison technique that is designed for compute efficiency and then narrowing the initial set of candidate matches down to a final set using a second comparison technique that is designed for accuracy, which improves upon existing technologies that fail to strike a proper balance between these considerations. In this respect, the primary downside of the first comparison technique—namely, that it tends to be overinclusive and thus less accurate—is offset by the fact that the candidate matches identified using the first comparison technique are further narrowed by the second comparison technique, and then the primary downside of the second comparison technique—namely, that it tends to be more time consuming and computationally intensive—is offset by the fact that the first comparison technique is initially used to narrow the universe of possible matches to be evaluated using the second comparison so as to constrain the time and resources spent evaluating candidate matches using the second comparison technique. Further, in at least some implementations, the second comparison technique may be utilized a trained machine-learning model to determine which pairs of screened and watchlist parties to include in the final set of candidate matches, which may provide for a more accurate determination of candidate matches. Further yet, the disclosed screening tool provides increased transparency, configurability, and adaptability relative to existing watchlist screening technologies, thereby enabling the screening tool to evolve quickly and effectively to counteracting the evolving strategies that criminals use to avoid being flagged as matches. The disclosed screening tool also provides other advantages over the existing technology which are apparent from the detailed discussion of the screening tool that follows.

Turning now to the figures, FIG. 1 depicts one illustrative example of a computing environment 100 in which the disclosed software technology for watchlist screening may be implemented. As shown, the example computing environment 100 may include a back-end computing platform 102 operated by a business organization that is interested in conducting watchlist screening (e.g., a financial institution), a plurality of data sources 104, and a plurality of client devices 106, among other possibilities.

The back-end computing platform 102 may comprise any one or more computer systems (e.g., one or more servers) that have been installed with software for carrying out the watchlist screening functionality disclosed herein. In practice, the one or more computer systems of the back-end computing platform 102 may collectively comprise some set of physical computing resources (e.g., one or more processors, data storage system, communication interfaces, etc.), which may take any of various forms. As one possibility, the back-end computing platform 102 may comprise cloud computing resources supplied by a third-party provider of "on demand" cloud computing resources, such as Amazon Web Services (AWS), Amazon Lambda, Google Cloud, Microsoft Azure, or the like. As another possibility, the back-end computing platform 102 may comprise "on-premises" computing resources of the given provider (e.g., servers owned by the given provider). As yet another possibility, the back-end computing platform 102 may comprise a combination of cloud computing resources and on-premises computing resources. Other implementations of the back-end computing platform 102 are possible as well.

Further, in practice, the software for carrying out the watchlist screening functionality may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, the software for carrying out the watchlist screening functionality may interact with a data storage layer of the back-end computing platform 102, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

As shown, the back-end computing platform 102 may be communicatively coupled to a plurality of data sources 104 over respective communication paths. In general, each of these data sources 104 may comprise a computing system that is configured to provide the back-end platform 102 with data related to the watchlist screening functionality disclosed herein, such as watchlist data, customer data, partner data, and/or transaction data, among other possible types of data that may be provided by the data sources 104. As some representative examples, each such data source 104 could take the form of a computing system operated by an entity that maintains watchlist data (e.g., the OFAC), a client device operated by a customer or partner of the organization operating the back-end computing platform 102, or a computing system operated by a payment processor or merchant acquirer, among various other possibilities.

As further shown, the back-end computing platform 102 may be communicatively coupled to a plurality of client devices 106 over respective communication paths. In general, each of these client devices 106 may comprise any computing device that enables a user to access and interact with the back-end computer platform 102 in order to carry out tasks related to the disclosed watchlist screening functionality, such as configuration of the watchlist screening functionality and/or evaluation of candidate watchlist matches. In this respect, each client device 106 may include hardware components such as one or more processors, computer-readable mediums, communication interfaces, and input/output (I/O) components (or interfaces for connecting thereto), among other possible hardware components, as well as software that enables a user to access and interact with the back-end computing platform 102 in order to carry out tasks related to the disclosed watchlist screening functionality (e.g., operating system software, web browser software, a mobile application, etc.). As representative examples, each of example client devices 106 may take the form of a desktop computer, a laptop, a netbook, a tablet, a smartphone, or a personal digital assistant (PDA), among other possibilities.

In practice, the respective communication path between the back-end computing platform 102 and each data source 104 or client device 106 may generally comprise one or more data networks and/or data links, which may take any of various forms. For instance, the respective communication path between the back-end computing platform 102 and a given data source 104 or client device 106 may include any one or more of a Personal Area Network (PAN), a Local Area Network (LAN), a Wide Area Networks (WAN) such as the Internet or a cellular network, a cloud network, and/or a point-to-point data link, among other possibilities, where each such data network and/or link may be wireless, wired, or some combination thereof, and may carry data according to any of various different communication protocols. Additionally, the communication between the back-end computing platform 102 and a given data source 104 or client device 106 could be carried out via an Application Programming Interface (API), among other possibilities. Additionally, although not shown, the respective communication path between the back-end computing platform 102 and a given data source 104 or client device 106 could also include one or more intermediate systems, examples of which may include a data aggregation system or a host server, among other possibilities. Many other configurations are also possible.

It should be understood that the computing environment 100 is one example of a computing environment in which the disclosed software technology may be implemented, and that numerous other examples of computing environments are possible as well. For instance, in some implementations, the back-end computing platform 102 may additionally have a communication path with a third-party computing platform that is provided with access to data generated by the back-end computing platform 102 in accordance with the disclosed watchlist screening functionality (e.g., watchlist matches) via an API or the like.

Figure 2:
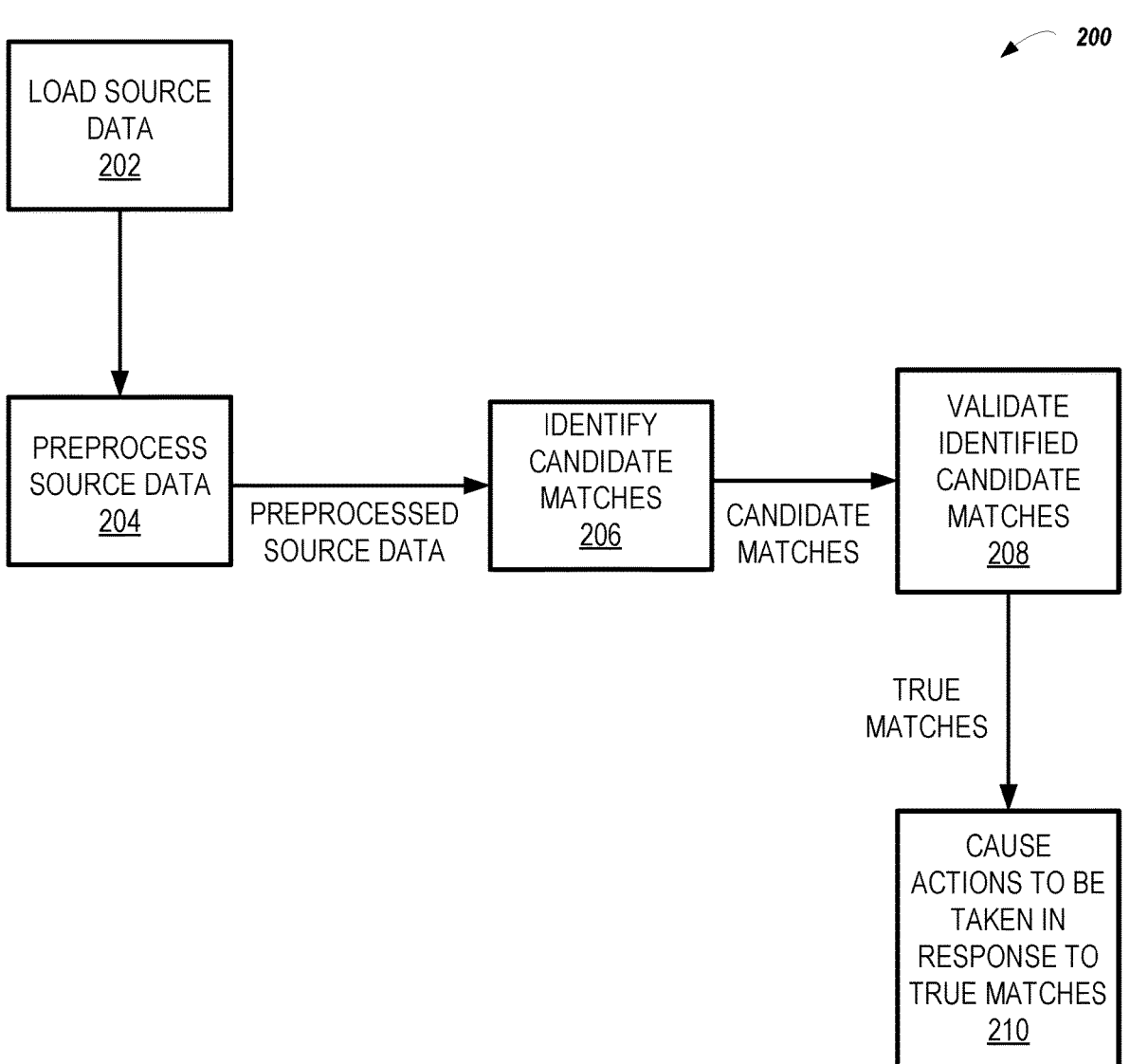
FIG. 2 depicts an example software pipeline to facilitate describing example operations that may be carried out in accordance with the disclosed software technology for watchlist screening.

Turning now to FIG. 2, an example software pipeline 200 is illustrated to facilitate describing example operations that may be carried out in accordance with the disclosed software technology for watchlist screening. In practice, the example software pipeline 200 of FIG. 2 may be encoded in the form of program instructions that are executable by one or more processors of a computing platform, and for purposes of illustration, the example software pipeline 200 of FIG. 2 is described as being carried out by the back-end computing platform 102 of FIG. 1, but it should be understood that the example software pipeline 200 of FIG. 2 may be carried out by any one or more computing platforms that are capable of performing the functionality of the example software pipeline 200. Further, it should be understood that the example software pipeline 200 of FIG. 2 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

As shown in FIG. 2, the example software pipeline 200 may begin at block 202 by loading source data that is to be utilized to perform the watchlist screening functionality. In general, this source data may include (i) data identifying parties that appear on one or more watchlists, such as individuals and/or business entities are considered to present an increased risk of engaging in illegal or otherwise improper behavior (e.g., bribery, trafficking, terrorist financing, fraud, etc.), which as noted above may be referred to herein as "watchlist parties," and (ii) data identifying parties that are to be screened against the one or more watchlists, such as customers and/or partners of the business organization that is implementing the disclosed software technology, which as noted above may be referred to herein as "screened parties."

In general, the source data identifying the watchlist parties may comprise a collection of data entries that each include values for certain attributes that serve to identify a respective watchlist party. These identifying attributes may take any of various forms. For example, if the watchlist parties include individuals (i.e., natural persons), then the identifying attributes could include a name (e.g., first, last, middle, maiden, etc.), a date of birth, a social security number, and/or an address (e.g., a home or mailing address) of the individual, among other possibilities. As another example, if the watchlist parties include business entities (i.e., juridical persons), then the identifying attributes could include a name (e.g., a corporate or d/b/a name), a tax identification number, and/or an address of the business entity, among other possibilities. The attributes that are included in the source data identifying the watchlist parties could take various other forms as well.

In practice, the source data identifying the watchlist parties could take the form of watchlist data that is received by the back-end data platform 102 from one or more data sources 104 (e.g., by making a call to an API of the one or more data sources 104). However, the source data identifying the watchlist parties could take other forms as well, including but not limited to the possibility that the source data identifying the watchlist parties could comprise a watchlist dataset that was previously generated by the back-end data platform 102 from raw watchlist data that was received from one or more data sources 104.

Further, in general, the source data identifying the screened parties may comprise a collection of data entries that each includes values for certain attributes that serve to identify a respective screened party. As with the identifying attributes for the watchlist parties, these identifying attributes for the screen parties may take any of various forms. For example, if the screened parties include customers of the business organization that is implementing the disclosed software technology, then the identifying attributes could include a name (e.g., first, last, middle, maiden, etc.), a date of birth, a social security number, and/or an address (e.g., a home or mailing address) of a customer, among other possibilities. As another example, if the screened parties include partners of the business organization that is implementing the disclosed software technology, then the identifying attributes could include a name (e.g., a corporate or d/b/a name), a tax identification number, and/or an address of a partner, among other possibilities. The attributes that are included in the source data identifying the screened parties could take various other forms as well. Moreover, in at least some implementations, the attributes that are included in the source data identifying the screened parties could be defined based on user input received via a user interface that is provided by the example software pipeline 200.

In practice, the source data identifying the screened parties could take the form of a customer dataset and/or a partner dataset for the business organization that is implementing the disclosed software technology, which could be accessed from a data storage layer of the back-end computing platform 102 or generated by the back-end computing platform 102 based on a request from the example software pipeline 200, among other possible ways that a customer and/or partner dataset may be obtained. Additionally or alternatively, the source data identifying the screened parties could take the form of transaction data comprising transaction-related data entries that include identifying attributes for parties involved in the transactions (e.g., customers or partners of the business organization), which may be received by the back-end data platform 102 from one or more data sources 104. The source data identifying the screened parties could take various other forms as well.

In operation, the example software pipeline 200 may load the source data for the watchlist screening functionality at any of various times. For instance, the example software pipeline 200 may be configured to load such source data on a periodic basis (e.g., according to a schedule) and/or in response to certain triggering events (e.g., receiving a request from a user, detecting the availability of new source data, etc.). Further, the example software pipeline's logic for determining which particular source data to load during each iteration of the pipeline could be hardcoded into example software pipeline 200, configured based on user input received via a user interface that is provided by the example software pipeline 200 and/or other configuration data that is defined by the back-end computing platform 102, or some combination thereof, among other possibilities.

At block 204, after loading the source data, the example software pipeline 200 may carry out certain pre-processing operations on the source data in order to prepare such data for use by the matching process described below. These pre-processing operations could take any of various forms.

As one possibility, the pre-processing operations that are carried out on the source data by the example software pipeline 200 may involve transforming the respective data entries for the watchlist parties and/or the screened parties into data entries comprising a common set of attributes that are to be utilized by the matching process (e.g., by either modifying the original data entries or generating new data entries that comprise transformed versions of the original data entries). For instance, the example software pipeline 200 may re-format certain fields, re-arrange certain fields, remove certain fields, and/or add certain fields to the respective entries for the watchlist parties and/or the screened parties so that the respective data entries for both the watchlist parties and the screened parties include a common set of attributes that can be utilized by the matching process, among other possible functions that may be carried out by the example software pipeline 200 in order to transform the respective data entries for the watchlist parties and/or the screened parties into data entries comprising a common set of attributes. Additionally, if the source data for the screened parties takes the form of transaction data, then in addition to transforming the respective data entries into data entries comprising a common set of attributes that are to be utilized by the matching process, the example software pipeline 200 may optionally re-structure and/or re-arrange the data entries such that they are organized according to screened party rather than transaction (although in other implementations the example software pipeline 200 may maintain the translation-level organization of the data entries). Further, in practice, the common set of attributes that are to be included in the transformed data entries could be hardcoded into the example software pipeline 200, configured based on user input received via a user interface that is provided by the example software pipeline 200 and/or other configuration data that is defined by the back-end computing platform 102, or some combination thereof, among other possibilities.

As another possibility, the pre-processing operations that are carried out on the source data by the example software pipeline 200 may involve replacing or supplementing certain words that appear in the respective data entries for the watchlist parties and/or the screened parties with known variations of such words (e.g., synonyms), which may reduce the risk of erroneously failing to identify matches between screened parties and watchlist parties (i.e., false negatives). For instance, the example software pipeline 200 may be configured to replace or supplement certain names with known variations of those names, among other possible types of words that may be replaced or supplemented with known variations. To illustrate with an example, the names "James," "Jim," "Jimmy," "Iago," "Santiago," "Yakov," "Jacob," and "Ιακωβος," "Jacobus," and "Jacomus" could all be considered variations of one another, and the example software pipeline 200 may be configured to either (i) replace any instance of one of these names that appears in the respective data entries for the watchlist parties and/or the screened parties with one designated variant of the name (e.g., "James") or (ii) supplement any instance of one of these names that appears in the respective data entries for the watchlist parties and/or the screened parties with the other known variations of the name, so that those variations are also available for use by the matching process. Many other examples are possible as well. Further, in practice, the words that are to be replaced or supplemented with variations could be hardcoded into the example software pipeline 200, configured based on user input received via a user interface that is provided by the example software pipeline 200 and/or other configuration data that is defined by the back-end computing platform 102, or some combination thereof, among other possibilities.

As yet another possibility, the pre-processing operations that are carried out on the source data by the example software pipeline 200 may involve removing certain characters and/or words from the respective data entries for the watchlist parties and/or the screened parties that may degrade the performance of the matching process. For example, the example software pipeline 200 may be configured to remove certain types of punctuation, stop words, and/or other words that are expected to appear in many different data entries for the watchlist parties and/or the screened parties (e.g., "corp," "inc," etc.), among other possible types of words that may be removed. As another example, the example software pipeline 200 may optionally be configured to remove (or replace) certain types of text that may be included as part of the name attributes included within data entries for the watchlist parties and/or the screened parties, such as middle initials or name suffixes (e.g., Jr., Sr., II, III, etc.). Further, in practice, the characters and/or words that are to be removed could be hardcoded into the example software pipeline 200, configured based on user input received via a user interface that is provided by the example software pipeline 200 and/or other configuration data that is defined by the back-end computing platform 102, or some combination thereof, among other possibilities.

As still another possibility, the pre-processing operations that are carried out on the source data by the example software pipeline 200 may involve excluding any data entries for the watchlist parties and/or the screened parties that meet certain exclusion criteria. For instance, the example software pipeline 200 may be configured to exclude a data entry for a watchlist party or screened party if the party is determined to be a deceased individual or a defunct company, among other possible types of exclusion criteria that may be applied to the respective data entries for the watchlist parties and/or the screened parties. Further, in practice, the exclusion criteria that is applied could be hardcoded into the example software pipeline 200, configured based on user input received via a user interface that is provided by the example software pipeline 200 and/or other configuration data that is defined by the back-end computing platform 102, or some combination thereof, among other possibilities.

The pre-processing operations that are carried out on the source data by the example software pipeline 200 could take various other forms as well, including but not limited to operations related to integrating, cleaning, de-duping, filtering, aggregating, enriching, restructuring, reformatting, and/or otherwise transforming the source data.

At block 206, after pre-processing the source data, the example software pipeline 200 may carry out functionality for identifying candidate matches between screened parties and watchlist parties based on the pre-processed source data. This match-identification functionality may take any of various forms and will be described in further detail below with reference to FIG. 3.

At block 208, after identifying candidate matches between screened parties and watchlist parties, the example software pipeline 200 may carry out functionality for validating the identified candidate matches between screened parties and watchlist parties, which may result in a determination of a set of "true matches" between screened parties and watchlist parties. This match-validation functionality may take any of various forms.

As one possibility, the match-validation functionality carried out by the example software pipeline 200 may involve (i) causing at least a subset of the identified candidate matches to be presented to one or more analysts that are tasked with reviewing the candidate matches to validate whether or not they appear to be true matches (e.g., whether or not the screened party truly appears to the same as the watchlist party) and then (ii) receiving data indicating the validation decisions made by the one or more analysts for the candidate matches, which may be utilized by the example software pipeline 200 to determine the set of true matches between screened parties and watchlist parties. For instance, the example software pipeline 200 may cause a client device associated with an analyst (e.g., one of the client devices 106) to present a user interface that shows at least a subset of the candidate matches identified by the example software pipeline 200 and enables the analyst to input validation decisions for any one or more of those candidate matches, such as by interaction with selectable user-interface elements (e.g., checkboxes, buttons, sliders, etc.), and then after the analyst inputs his or her validation decisions, the client device may send data indicating the validation decisions to the back-end computing platform 102, which may in turn provide that data to the example software pipeline 200 so that it can be utilized determine the set of true matches between screened parties and watchlist parties.

The user interface for evaluating the candidate matches that may be presented to the one or more analysts may take any of various forms. As one possibility, the user interface may present the candidate matches in the form of a list, a table, or the like comprising respective line items for the candidate matches, where each such line item comprises any of various information about the candidate match, examples of which may include an identification number of the candidate match, identifying information for the screened party (e.g., name, identification number, etc.), identifying information for the watchlist party (e.g., name, identification number, etc.), a type of watchlist party (e.g., politically exposed person, etc.), a match identification date, a transaction amount (if the source data for the screened parties takes the form of transaction data), and/or identifying information for an analyst that has been assigned to review the candidate match, among various other possibilities. In practice, these line items may be selectable (e.g., via a checkbox or the like) so as to allow an analyst to select one or more line items and input a validation decision for the one or more line items. Additionally, the user interface may enable an analyst to open a given candidate match in a new window that allows the analyst to perform additional functionality related to the candidate match, such as inputting a validation decision, assigning it to a different analyst, or adding other details to the data entry for the candidate match (e.g., attachments, notes, etc.), among other possibilities. The user interface for evaluating the candidate matches may take various other forms as well.

In some implementations, as part of causing at least a subset of the identified candidate matches to be presented to one or more analysts, the example software pipeline 200 may function to aggregate candidate matches that involve the same screened party and/or the same watchlist party. For instance, in a scenario where the source data identifying the screened parties includes multiple data entries for the same screened party and the example software pipeline 200 identifies multiple candidate matches that involve that same screened party, the example software pipeline 200 may cause the multiple candidate matches to be presented to an analyst in an aggregated manner (e.g., by presenting them as a group or collapsing them together and presenting as a single candidate match), which may allow an analyst to review and input a validation decision for the multiple candidate matches one time as opposed to multiple times. In this way, the example software pipeline 200 may make an analyst's task of reviewing and validating candidate matches more efficient and less time consuming and may also avoid the possibility of receiving conflicting validation decisions for the same screened party, among other benefits of aggregating candidate matches.

As another possibility, the match-validation functionality carried out by the example software pipeline 200 may involve evaluating at least a subset of the identified candidate matches in order to automatically validate whether or not they appear to be true matches. For instance, in a scenario where each identified candidate match has a corresponding value that indicates a predicted likelihood of being a match (e.g., a likelihood value predicted by the match-identification process), then the example software pipeline 200 may be configured to compare each candidate match's likelihood value to a true-match threshold (e.g., 80%) and then either (i) automatically validate the candidate match as a true match if its likelihood value meets or exceeds the true-match threshold or (ii) include the candidate match in the subset of candidate matches that are to be presented to one or more analysts if its likelihood value falls below the true-match threshold (or perhaps automatically determine that the candidate match is a false match).

The match-validation functionality that is carried out by the example software pipeline 200 may take other forms as well.

At block 210, after determining the set of true matches between screened parties and watchlist parties, the example software pipeline 200 may cause any of various actions to be taken. For instance, as one possibility, the example software pipeline 200 may cause true-match reports, true-match alerts, or the like to be generated and distributed to any of various interested parties (e.g., employees of the business organization that implements the software technology, third-party business organizations, government agencies, etc.). As another possibility, the example software pipeline 200 may cause the back-end computing platform 102 to impose certain restrictions on the services that can be utilized and/or tasks that can be performed by the screened parties that have been identified as true matches to watchlist parties. For example, the example software pipeline 200 may cause the back-end computing platform 102 to suspend the ability for such parties to engage in any financial transactions that are facilitated by the business organization. Many other examples are possible as well.

After the example software pipeline 200 is used to identify candidate matches and then validate true matches during one or more iterations, certain aspects of the example software pipeline 200 could also be adjusted (or "tuned") based on an evaluation of the matching performance of the example software pipeline 200—such as the rate of candidate matches that are validated to be true matches. The aspects of the example software pipeline 200 could also be adjusted (or "tuned") based on an evaluation of the matching performance of the example software pipeline 200 could take any of various forms, examples of which may include configuration parameters for the pre-processing operations, configuration parameters for the match-identification functionality (e.g., a likelihood threshold used to identify the candidate matches), and/or configuration parameters for the match-validation functionality (e.g., a likelihood threshold used to automatically determine true matches), among other possibilities.

As one possibility, suppose the pipeline failed to include a large number of true matches in the initial set of candidate matches. In this example, the threshold similarity score used to determine whether pairs are added to the set of pairs (e.g., as described above in relation to block 308) may be reduced so that additional pairs will be added to the set of pairs, thereby facilitating adding more of the corresponding candidate matches (to which those additional pairs map) to the initial set of candidate matches. If the number of pairs in the set of pairs exceeded the threshold number of pairs (e.g., as described above in relation to block 308) such that many pairs were removed from the set of pairs after initially being added thereto, the threshold number of pairs can also be increased to facilitate adding more of the corresponding candidate matches to the initial set of candidate matches. Also, the threshold likelihood value that dictates whether or not a candidate match from the initial set is included in the final set may be reduced to facilitate adding more candidate matches to the final set.

The operations that are carried out in accordance with the disclosed software technology for watchlist screening may take various other forms as well.

One possible embodiment of the match-identification functionality 300 that may be carried out in accordance with the disclosed software technology will now be described with reference to the flow chart of FIG. 3. In practice, the match-identification functionality 300 of FIG. 3 may be encoded in the form of program instructions that are executable by one or more processors of a computing platform, and for purposes of illustration, the match-identification functionality 300 of FIG. 3 is described as being carried out by the back-end computing platform 102 of FIG. 1, but it should be understood that the match-identification functionality 300 of FIG. 3 may be carried out by any one or more computing platforms that are capable of being installed with software for performing the functions described below. Further, it should be understood that the match-identification functionality 300 of FIG. 3 is merely described in this manner for the sake of clarity and explanation and that the example may be implemented in various other manners, including the possibility that functions may be added, removed, rearranged into different orders, combined into fewer blocks, and/or separated into additional blocks depending upon the particular example.

In line with discussion above, the match-identification functionality 300 may involve two phases. During a first phase, the back-end computing platform 102 may determine an initial set of candidate matches between data entries for screened parties (which may be referred to herein as "screened entries") and data entries for watchlist parties (which may be referred to herein as "watchlist entries") using a first comparison technique that is generally designed to identify candidate matches in a less time consuming and less computationally intensive (but perhaps overinclusive) manner. Then, during a second phase, the back-end computing platform 102 may further evaluate the candidate matches in the initial set using a second comparison technique that is generally designed to identify candidate matches in a more accurate (but perhaps more time consuming and/or more computationally intensive) manner and thereby determine a final set of candidate matches between screened entries and watchlist parties. In FIG. 3, one possible example of the functionality for the first phase is described with reference to blocks 302-308, and one possible example of the functionality for the second phase is then described with reference to blocks 312-316. For illustrative purposes, the match-identification functionality 300 of FIG. 3 will be described below in the context of matching a business organization's customers with watchlist parties, but it should be understood that the match-identification functionality 300 of FIG. 3 may similarly be utilized to match other types of screened parties with watchlist parties, such as a business organization's partners.

As shown in FIG. 3, the first phase of the match-identification functionality 300 may begin at block 302 with the back-end computing platform 102 selecting at least a first attribute to use as a basis for comparing customers to watchlist parties. As one possible example, the first attribute may be a name attribute that identifies a party's name (e.g., an attribute that identifies a first name, a last name, and possibly a middle name), which may be one possible attribute for which values are included in the respective data entries for the customers and the watchlist parties. For illustrative purposes, the functionality of the first phase will be described below with reference to such a "Name" attribute. However, it should be understood that the first attribute could comprise any of the other identifying attributes described above, including but not limited to date of birth, social security number, or address.

At block 304, the back-end computing platform 102 transforms the respective name value for each respective customer entry and each watchlist entry, respectively, into at least one corresponding sequence of textual segments (e.g., substrings of alphameric characters) that represents the entry's name value.

The functionality of transforming a respective name value to into at least one respective sequence of textual segments could take any of various forms. (In practice, the textual segments in a sequence could have an ordering that tracks the ordering of how those textual segments appear in the name value and/or could have some other ordering, such as alphabetical or the like).

For instance, as one possibility, the functionality of transforming a name value into a corresponding sequence of textual segments may involve transforming the name value into a sequence of constituent words found within the name value, such as first name, middle name (if present), and last name. To illustrate with an example, if a given name value is "James Dillingham Young," the back-end computing platform 102 may transform this name into a sequence of the constituent words found therein (e.g., by treating whitespace as a delimiter that separates textual segments), which may include textual segments of "James," "Dillingham," and "Young" (i.e., the first, middle, and last name). Many other examples are possible as well.

As another possibility, the functionality of transforming a name value into a corresponding sequence of textual segments may involve transforming the name value into a sequence of n-grams found within the name value, examples of which may include bigrams (i.e., 2-grams), trigrams (i.e., 3-grams), and/or n-grams of other sizes. To illustrate with one example, if a given name value is "James Dillingham Young," the back-end computing platform 102 could transform this name into a sequence of bigrams found therein, which may include "Ja," "am," "me," and so on. Or to illustrate with another example, if a given name value is "James Dillingham Young," the back-end computing platform 102 could transform this name into a sequence of trigrams found therein, which may include "Jam," "ame," "mes," and so on. Many other examples are possible as well.

The functionality of transforming a name value into a corresponding sequence of textual segments may take other forms as well. For instance, in some implementations, the functionality of transforming a name value into a corresponding sequence of textual segments may involve excluding certain textual segments produced by the transforming from the sequence. Other implementations of the transforming functionality are possible as well.

Further, depending on the implementation, the back-end computing platform 102 may be configured to transform a respective name value for each customer entry and each watchlist entry into either (i) a single corresponding sequence of textual segments, in which case a single one of the foregoing transforming techniques may be utilized (e.g., transforming into either bigrams or trigrams but not both), or (ii) multiple corresponding sequences of textual segments, in which case multiple of the foregoing transforming techniques may be utilized (e.g., transforming into both bigrams and trigrams), among other possibilities. And in implementations where the back-end computing platform 102 is configured to transform a respective name value for each respective customer entry and each watchlist entry into multiple corresponding sequences of textual segments, the comparison between a customer entry and a watchlist entry that is carried out based on the name attribute may involve multiple different comparisons-one for each of the different sequences of textual segments corresponding to the name values.

Further yet, in practice, the back-end computing platform 102 may be configured to perform this transformation functionality for the name values of the customer entries and the name values of the watchlist entries at any of various points during the process. For instance, in some implementations, the back-end computing platform 102 may be configured to perform this transformation functionality for both the name values of the customer entries and the name values of the watchlist entries after the source data for both the customer entries and the watchlist entries have been loaded and pre-processed (i.e., after the functionality described at blocks 204 and 206 has been completed for both the customer entries and the watchlist entries). In other implementations, the back-end computing platform 102 may be configured to perform this transformation functionality for the name values of the customer entries at the time that the source data for the customer entries is pre-processed, and to perform this transformation function for the name values of the watchlist entries at the time that the source data for the watchlist entries is pre-processed-which could be the same time or different times. Other implementations are possible as well.

At block 306, for each customer entry and each watchlist entry, the back-end computing platform 102 may convert the entry's at least one sequence of textual segments that represents the entry's respective name value into at least one corresponding sequence of numeric values that represents the entry's respective name value.

The functionality of converting the sequences of textual segments into corresponding sequences of numeric values—and the numeric values that are included in these sequences—may take any of various forms.

As one possibility, the back-end computing platform 102 may convert each sequence of textual segments into a corresponding sequence of numeric values that each take the form of Term Frequency-Inverse Document Frequency (TF-IDF) value for the textual segments.

In general, a Term Frequency (TF) value is a metric that indicates how frequently a particular term (e.g., a word) appears in a document. Such a TF value can be determined in any of various ways. For instance, as one example, a TF value for a given term can be determined by determining a simple count of the number of times that the given term appears in a document. As another example, a TF value for a given term can be determined by (i) determining a simple count of the number of times that the given term appears in a document and then (ii) dividing the number of times the given term appears in the document by the total number of terms that appear in the document. For instance, consider an example in which the sentence "I scream, you scream, we all scream for ice cream!" is treated as the document. To determine the TF value for the term "scream," the number of times "scream" appears in the document (three) would be divided by the total number of terms that appear in the document (seven if "for" is treated as a stop word), resulting in a TF value of 0.42857143.

To determine TF values in the context of the match-identification functionality 300, textual segments are treated as terms and attribute values are treated as documents. To illustrate with a first example where the name is "John Kelly" and the textual segments include discrete words, then the TF value for the word "john" (case insensitive) could either be 1 (if using a count) or ½ (if dividing the count by the total number of textual segments) and the word "kelly" (case insensitive) could likewise either be 1 (if using a count) or ½ (if dividing the count by the total number of terms). Or to illustrate with a second example where the name is "Vivian" (no last name) and the textual segments include bigrams, then the TF value for the bigram "vi" (case insensitive) that appears twice in the name value could either be 2 (if using a count) or ⅔ (if dividing the count by the total number of textual segments). Many other examples are possible as well.

While a TF value of a particular term indicates how pertinent the term is to a single document's meaning, Inverse Document Frequency (IDF) is a metric that indicates how common that term is across multiple documents in a collection (corpus) of documents. Put simply, the IDF value reflects the extent to which a term that appears in a document distinguishes that document from other documents in the collection. On one hand, if the term appears in each document in the collection, the mere appearance of that term in a document does not make that document stand out from the other documents in the collection. On the other hand, if the term appears in just one particular document in the collection, the term's appearance helps to distinguish that particular document from the other documents in the collection. At a high level, such an IDF value for a particular term can be determined based on two values: (i) the number of documents in the collection that contain the term and (ii) the total number of documents in the collection. For instance, one approach for determining an IDF value for a particular term may involve (i) determining the total number of documents in the collection and optionally increasing that value by 1, (ii) determining the number of documents in the collection that contain the term and optionally increasing that value by 1 (to avoid dividing by zero), (iii) dividing the value of (i) by the value of (ii), and (iv) determining a logarithm of the value of (iii) (e.g., a logarithm having a base of e, 2, 10, etc.). However, other approaches for determining a term's IDF value are possible as well, including but not limited to approaches that do not increase the total number of documents by 1 and/or do not increase the number of documents in the collection that contain the term by 1.

To determine IDF values in the context of the match-identification functionality 300, textual segments are treated as terms and the attribute values across some collection of data entries (e.g., the watchlist entries, the screened entries, or a combination of the two) are treated as the collection of documents. To illustrate with a first example where the textual segment at issue is the word "john" and the collection of documents is the collection of name values across the watchlist entries, the IDF value for "john" can be determined based on the number of watchlist entries having a name attribute that contains the word "john" and the total number of watchlist entries. Or to illustrate with a second example where the textual segment is the trigram "viv" and the collection of documents is the collection of name values across the watchlist entries, the IDF value for "viv" can be determined based on the number of watchlist entries having a name attribute that contains the trigram "viv" and the total number of watchlist entries. In these examples, if the word "john" or the trigram "viv" is common and appears in the name attribute of a larger extent of watchlist entries, then the IDF value will typically be closer to 0, whereas if the word "john" or the trigram "viv" is uncommon and appears in the name attribute of a smaller extent of watchlist entries, then the IDF value will typically be closer to 1. Many other examples are possible as well.

Once the TF value and the IDF value for a term have been determined, the TF-IDF value for the term may be determined by multiplying the TF by the IDF. As the multiplicative product of the TF and the IDF, the TF-IDF reflects a combination of the properties reflected by the TF and the IDF, respectively. Additionally, the TF-IDF value for the term could also be normalized in some manner.

Thus, in summary, the back-end computing platform 102 may determine a TF-IDF value for a given textual segment that appears in a sequence of textual segments by (i) calculating a TF value for the given textual segment, (ii) calculating an IDF value for the given textual segment, (iii) multiplying the TF value by the IDF value to obtain the TF-IDF value for the given textual segment, and (iv) optionally normalizing the TF-IDF value.

The function of determining a TF-IDF value for a given textual segment may take other forms as well.

Further, the process by which the back-end computing platform 102 converts the sequences of textual segments for the customer entries and watchlist entries into corresponding sequences of TF-IDF values may take any of various forms.

As one possible implementation, the back-end computing platform 102 may use the collection of name values across the watchlist entries as the collection of documents for determining the IDF values, and may begin by learning the universe of unique textual segments that are contained within that collection, which may be referred to as the "vocabulary" of the collection. To illustrate with an example, if the collection of name values across the watchlist entries includes 100 unique textual segments (e.g., unique words, bigrams, trigrams, etc.), then the back-end computing platform 102 may determine a learned vocabulary of 100 terms. Further, in practice, the learned vocabulary for the collection may have some defined ordering, which could be alphabetical order or could be some other defined ordering (e.g., the order in which the terms are learned during the evaluation of the name values across the watchlist entries).

After learning the vocabulary of the collection of name values across the watchlist entries, the back-end computing platform 102 may determine a respective IDF value for each textual segment in the vocabulary. For instance, in line with the discussion above, the back-end computing platform 102 may determine a respective IDF value for each textual segment in the vocabulary by (i) determining the total number of watchlist entries and optionally increasing that value by 1, (ii) determining the number of watchlist entries having a name attribute that contains the textual segment and optionally increasing that value by 1 (to avoid dividing by zero), (iii) dividing the value of (i) by the value of (ii), and (iv) determining a logarithm of the value of (iii) (e.g., a logarithm having a base of e, 2, 10, etc.).

In this implementation, the back-end computing platform 102 may then use the learned vocabulary of the collection of name values across the watchlist entries and the corresponding IDF values to determine the sequences of TF-IDF values for both the watchlist entries and the customer entries. This functionality may take various forms.

As one possibility, the back-end computing platform 102 may convert each respective sequence of textual segments into a sequence of TF-IDF values that takes the form of a TD-IDF vector having a length (i.e., a number of TF-IDF values) and an ordering that correlates to the length (i.e., the number of terms) and ordering of the learned vocabulary. For instance, if the learned vocabulary has 100 terms arranged in alphabetical order, then each sequence of TF-IDF values may take the form of a TD-IDF vector having 100 TF-IDF for the 100 terms in the vocabulary that are arranged in the same order as the vocabulary-namely, the first TF-IDF value in the vector is for the first term in the vocabulary, the second TF-IDF value in the vector is for the second term in the vocabulary, and so on. And to produce such a TF-IDF vector for a given sequence of textual segments, the back-end computing platform 102 may determine a respective TF-IDF value to include in the TF-IDF vector for each respective term from the vocabulary by (i) determining a respective TF value indicating the term frequency of the respective term within the given sequence of textual segments, which will be either zero if the respective term does not appear in the given sequence of textual segments or non-zero if the respective term does appear in the given sequence of textual segments, (ii) multiplying the respective TF value by the respective IDF value for the respective term from the vocabulary (which may have been previously determined as discussed above), and (iii) optionally normalizing the resulting TF-IDF value. In this respect, if the given sequence of textual segments contains a term from the vocabulary, then the respective TF-IDF value that is determined and included in the TF-IDF vector for that term will be non-zero, whereas if the given sequence of textual segments does not contain a term from the vocabulary, then the respective TF-IDF value that is determined and included in the TF-IDF vector for that term will be zero. Given that the vocabulary was learned from the watchlist entries in this example, it will also be understood that a sequence of textual segments for a customer entry may include a textual segment that will not be included in the vocabulary and thus will not be represented in the corresponding vector of TF-IDF values.

To illustrate with an example, if the vocabulary learned from the watchlist entries comprises 100 terms arranged in alphabetical order where the term "john" is at the $35^{th}$ position within the vocabulary, the term "kelly" is at the $39^{th}$ position within the vocabulary, and the term "garcia" is not included within the vocabulary (because it was not learned from the watchlist entries), then (i) a first sequence of textual segments for a name of "John Kelly" that takes the form of {"john," "kelly") may be converted into a vector of 100 TF-IDF values where the $35^{th}$ and $39^{th}$ TF-IDF values in the vector are non-zero and all of the other TF-IDF values are zero and (ii) a second sequence of textual segments for a name of "John Garcia" that takes the form of {"john," "garcia") may be converted into a vector of 100 TF-IDF values where the $35^{th}$ TF-IDF value in the vector is non-zero and all of the other TF-IDF values are zero. Many other examples are possible as well.

Based on the foregoing functionality, the sequences of textual segments for the watchlist entries may be converted into a first set of TF-IDF vectors and the sequences of textual segments for the customer entries may be converted into a second set of TF-IDF vectors. Further, because each TF-IDF vector in both the first and second sets has the same length and ordering, the first set of TF-IDF vectors for the watchlist entries may be represented in the form of a first TF-IDF matrix and the second set of TF-IDF vectors for the customer entries may be represented in the form of a second TF-IDF matrix, where each such TF-IDF matrix has a first dimension corresponding to the entries included in the TF-IDF matrix (e.g., watchlist entries or customer entries) and a second dimension corresponding to the terms included in the learned vocabulary. In this respect, representing the first and second sets of TD-IDF vectors in the form of TF-IDF matrices may allow the TD-IDF vectors for the customer entries to be compared against the TD-IDF vectors for the watchlist entries in a more efficient manner.

The process by which the back-end computing platform 102 converts the sequences of textual segments for the customer entries and watchlist entries into corresponding sequences of TF-IDF values may take other forms as well. For example, instead of using the collection of name values across the watchlist entries as the collection of documents for determining the IDF values, the back-end computing platform 102 could use the collection of name values across both the watchlist entries and the customer entries as the collection of documents for determining the IDF values, in which case the vocabulary may be learned from both the watchlist entries and the customer entries. As another example, the back-end computing platform 102 may determine the vocabulary that defines the length and ordering of the TD-IDF vectors in some other manner.

The back-end computing platform 102 may convert the sequences of textual segments produced at block 304 into corresponding sequences of numeric values that take other forms as well. For example, word-embedding methods such as One Hot Encoding, Word2Vec, GloVe, FastText, or some other method that helps to capture semantic relationships between words could also be used. In general, the technique to be applied to transform textual segments into numeric values in any given instance may be selected based on various parameters, such as the amount of data to be processed, the characteristics of the data, and the purpose for which the data is being processed.

As a result of this functionality, the back-end computing platform 102 may produce either a single sequence of numeric values or multiple sequences of numeric values for each customer entry and each watchlist entry. For instance, in implementations where the back-end computing platform 102 is configured to transform a respective name value for each customer entry and each watchlist entry into a single corresponding sequence of textual segments, then the back-end computing platform 102 may produce a single corresponding sequence of numeric values (e.g., a single TF-IDF vector) that represents the respective name value of each customer entry and each watchlist entry. On the other hand, in implementations where the back-end computing platform 102 is configured to transform a respective name value for each customer entry and each watchlist entry into multiple corresponding sequences of textual segments, then the back-end computing platform 102 may produce multiple corresponding sequences of numeric values (e.g., multiple TF-IDF vectors) that represent the respective name value of each customer entry and each watchlist entry.

Further, in practice, the back-end computing platform 102 may be configured to perform this conversion functionality for the customer entries and watchlist entries at any of various points during the process. For instance, in some implementations, the back-end computing platform 102 may be configured to first complete the transformation functionality of block 304 for both the customer entries and the watchlist entries and then begin the conversion functionality of block 306. In other implementations, the back-end computing platform 102 may be configured to begin performing certain aspects of the conversion functionality of block 306 before the transformation functionality of block 304 has completed. For example, in an implementation where the vocabulary for use in producing the sequences of numeric values is learned from the watchlist entries, the back-end computing platform 102 could be configured to perform the transformation functionality of block 304 for the watchlist entries first and then to begin performing the functionality of block 306 for learning the vocabulary and determining the IDF values for the terms within the vocabulary in parallel with performing the transformation functionality of block 304 for the customer entries, which may allow the conversion functionality of block 306 to be completed more quickly. Other implementations are possible as well.

At block 308, after producing the sequences of numeric values that represent the respective name values of the customer and watchlist entries, the back-end computing platform 102 may identify candidate matches between customer entries and watchlist entries that are to be added to the initial set of candidate matches by comparing the sequences of numeric values for the customer entries with the sequences of numeric values for the watchlist entries. This functionality for comparing the sequences of numeric values for the customer entries with the sequences of numeric values for the watchlist entries may take any of various forms.

As one possible implementation, the functionality for comparing the sequences of numeric values for the customer entries with the sequences of numeric values for the watchlist entries may involve, for each possible pairing between a respective customer entry and a respective watchlist entry, determining at least one similarity score between the at least one sequence of numeric values that represents the name value of the respective customer entry and the at least one sequence of numeric values that represents the name value of the respective watchlist entry. In this respect, in implementations where the back-end computing platform 102 is configured to produce a single sequence of numeric values that represents the respective name value of each customer entry and each watchlist entry, then the back-end computing platform 102 may determine a single similarity score for each possible pairing of customer and watchlist entries. On the other hand, in implementations where the back-end computing platform 102 is configured to produce multiple sequences of numeric values that represent the respective name value of each customer entry and each watchlist entry, then the back-end computing platform 102 may determine multiple similarity scores for each possible pairing of customer and watchlist entries.

The similarity scores that are determined for the possible pairings of customer and watchlist entries may take any of various forms and be determined in any of various manners. As one possibility, the back-end computing platform 102 may determine a similarity score between a first sequence of numeric values that represents a name value of a customer entry and a second sequence of numeric values that represents a name value of a watchlist entry using a technique such as cosine similarity, which is a technique that involves finding the cosine of an angle between two vectors.

In general, a vector refers to a group of numeric values. For visualization purposes, each value in the vector corresponds to a respective direction. Since each value in a vector corresponds to a direction, each value in the vector may be visualized as an arrow that points toward the value's corresponding direction from an origin in a coordinate system. While the direction of the arrow indicates the direction of the corresponding value, the length of the arrow indicates the magnitude of the corresponding value. In other words, the larger the arrow is, the larger the numeric value that the arrow represents is. Collectively, the arrows that correspond to respective values in the vector can be visualized as a single arrow that points from the origin of the coordinate system to a point in the coordinate system that would be reached by (i) beginning at the origin and (ii) for each given value in the vector, traveling in the respective corresponding direction to distance equal to the given value. In some scenarios, it may be useful to quantify how similar two vectors are. In such scenarios, cosine similarity is one metric that can be used for this purpose. The cosine similarity technique involves receiving two vectors as input. As noted above, each vector can be represented by a single respective large arrow that begins at the origin in the coordinate system. The cosine similarity technique calculates the angle between the respective large arrows and returns the cosine of that angle. The value of the cosine indicates how similar the vectors are by indicates how different the directions in which their respective large arrows point are.

In the context of the match-identification functionality 300, the cosine similarity between the first sequence of numeric values that represents a name value of a customer entry and the second sequence of numeric values that represents a name value of a watchlist entry may be determined in any of various ways.

For instance, as one possibility, the first sequence of numeric values for the customer entry and the second sequence of numeric values for the watchlist entry may be embodied as vectors (e.g., the numeric values are treated as vector components), and the cosine similarity cosine ($\vec{V}_{a,c}$, $\vec{V}_{a,w}$) between a vector $\vec{V}_{a,c}$ comprising the first sequence of numeric values that represent the attribute a for the customer entry and a vector $\vec{V}_{a,w}$ comprising the second sequence of numeric values that represent the attribute a for the watchlist entry can be computed according to the following equation:

$$\text{cosine}(\vec{V}_{a,c}, \vec{V}_{a,w}) = \frac{\vec{V}_{a,c} \cdot \vec{V}_{a,w}}{\|\vec{V}_{a,c}\| \cdot \|\vec{V}_{a,w}\|},$$

where $\vec{V}_{a,c} \cdot \vec{V}_{a,w}$ is the dot product of $\vec{V}_{a,c}$ and $\vec{V}_{a,w}$, and $\|\vec{V}_{a,c}\|$ and $\|\vec{V}_{a,w}\|$ are the Euclidean norms of the vectors $\vec{V}_{a,c}$ and $\vec{V}_{a,w}$, respectively.

As another possibility, if the numeric values in the sequences of numeric values have been normalized, then the cosine similarity cosine ($\vec{V}_{a,c}$, $\vec{V}_{a,w}$) between a vector $\vec{V}_{a,c}$ comprising the first sequence of numeric values that represent the attribute a for the customer entry and a vector $\vec{V}_{a,w}$ comprising the second sequence of numeric values that represent the attribute a for the watchlist entry can be computed according to the following equation:

$$\text{cosine}(\vec{V}_{a,c}, \vec{V}_{a,w}) = \vec{V}_{a,c} \cdot \vec{V}_{a,w},$$

where $\vec{V}_{a,c} \cdot \vec{V}_{a,w}$ is the dot product of $\vec{V}_{a,c}$ and $\vec{V}_{a,w}$. In other words, if the numeric values in the sequences of numeric values have been normalized, then it may not be necessary to divide the dot product of $\vec{V}_{a,c}$ and $\vec{V}_{a,w}$ by the Euclidean norms of the vectors $\vec{V}_{a,c}$ and $\vec{V}_{a,w}$, respectively.

The cosine similarity between the first sequence of numeric values that represents a name value of a customer entry and the second sequence of numeric values that represents a name value of a watchlist entry may be determined in other manners as well.

In practice, the cosine similarity technique may run in linear time. In other words, the computational complexity of computing the cosine similarity between two vectors is O(n), where n represents the number of dimensions (i.e., numeric values) in each vector. Thus, the back-end computing platform 102 can compare the first sequence and the second sequence quickly via the cosine similarity technique without unduly tying up computing resources.

Further, in implementations where the sequences of textual segments for the watchlist entries and the sequences of textual segments for the customer entries are converted into two TF-IDF matrices as described above, the cosine similarity functionality may be carried out at a matrix level rather than a vector level, which may further increase the efficiency of determining the similarity scores. For instance, instead of determining the dot product (and the Euclidean norms if necessary) on a vector-pairing-by-vector-pairing basis, the back-end computing platform 102 may determine the dot product (and the Euclidean norms if necessary) of the two TF-IDF matrices.

The similarity scores that are determined for the possible pairings of customer and watchlist entries may take other forms and be determined in other manners as well.

After determining the similarity scores for the possible pairings of customer and watchlist entries, the back-end computing platform 102 may then use those similarity scores as a basis for determining candidate matches between customer entries and watchlist entries that are to be added to the initial set of candidate matches. For instance, as one possibility, the back-end computing platform 102 may employ a threshold-based approach in which any pairing of customer and watchlist entries having at least one similarity score that satisfies a certain threshold similarity score is preliminarily determined to be a candidate match and added to the initial set of candidate matches. As another possibility, the back-end computing platform 102 may employ a ranking-based approach in which the pairings of customer and watchlist entries are ranked based on their similarity scores and then a given number of pairings from the top of the ranking (e.g., the top 25 or top 50) are preliminarily determined to be candidate matches and added to the initial set of candidate matches. As yet another possibility, the back-end computing platform 102 may employ of these threshold-based and ranking-based approaches in which a subset of pairings having similarity scores that meet a certain threshold similarity score is first determined, and then if the number of pairings in that subset exceeds a threshold number of candidate matches, the pairings in that subset are then ranked and a given number of pairings from the top of the ranking (e.g., the top 25 or top 50) are preliminarily determined to be candidate matches and added to the initial set of candidate matches. The function of using the determined similarity scores as a basis for determining candidate matches between customer entries and watchlist entries that are to be added to the initial set of candidate matches may take various other forms as well. As a result of performing the functionality of blocks 302-308 based on the name attribute, the back-end computing platform 102 may determine at least a subset of candidate matches that are to be added to the initial set of candidate matches. In this respect, in some implementations, the back-end computing platform 102 may be configured to carry out a single iteration of the functionality of blocks 302-308 based on the name attribute, and after completing that iteration, the back-end computing platform 102 may proceed to the second phase of match-identification functionality 300.

Alternatively, in other implementations, the back-end computing platform 102 may be configured to perform one or more additional iterations of the functionality of blocks 302-308 based on one or more other attributes for which values may appear in the customer and watchlist entries, such as date of birth, social security number, address, etc. In such implementations, the back-end computing platform 102 may determine one or more additional subsets of candidate matches (e.g., candidate matches that did not exhibit a sufficient level of name similarity but nevertheless exhibit a sufficient level of similarity for some other attribute) that are to be added to the initial set of candidate matches based on performing the one or more additional iterations of the functionality of blocks 302-308. Further, the back-end computing platform 102 may be configured such that, while adding the one or more additional subsets of candidate matches to the initial set of candidate matches, the back-end computing platform 102 identifies and removes any duplicate candidate matches (e.g., multiple candidate matches between the same pairing of customer and watchlist party).

Depending on the attribute that is selected for each of these additional iterations, the functionality of blocks 302-308 may also differ in some respects from the functionality described above. For example, for some attributes, the back-end computing platform 102 may skip the functionality of transforming the respective attribute value for each respective customer entry and each watchlist entry into at least one corresponding sequence of textual segments, in which case the respective attribute value of each customer entry and each watchlist entry may be treated as a single textual segment and may be converted into a single numeric value that represents the attribute value. As another example, the functionality of transforming the respective attribute value for each respective customer entry and each watchlist entry into at least one corresponding sequence of textual segments may different depending on the attribute—for some attributes, the back-end computing platform 102 may produce multiple corresponding sequences of textual segments of certain types, whereas for other attributes, the back-end computing platform 102 may produce a single corresponding sequence of textual segments (or multiple sequences of textual segments of different types). Other examples are possible as well.

After the back-end computing platform 102 has completed each iteration of the functionality of blocks 302-308 and has added each subset of candidate matches to the initial set of candidate matches, the back-end computing platform 102 may also optionally evaluate whether the number of candidate matches added to the initial set of candidate matches exceeds a threshold number of candidate matches, and if the number of candidate matches added to the initial set of candidate matches exceeds the threshold number, the back-end computing platform 102 may then carry out functionality for removing certain of the candidate matches from the initial set in order to reduce the number of candidate matches down to the threshold number. In this respect, the functionality carried out by the back-end computing platform 102 for removing candidate matches from the initial set may any of take various forms. For instance, as one possibility, the back-end computing platform 102 ranks the candidate matches in the initial set according to similarity score (where the highest similarity score across the different attributes is used for each candidate match) and then removing candidate matches from the bottom of the ranking until the number of candidate matches in the initial set is reduced down to the threshold number.

The functionality for determining the initial set of candidate matches could take various other forms as well.

As discussed above, after determining the initial set of candidate matches between customer entries and watchlist entries during the first phase of the match-identification functionality 300, the back-end computing platform 102 may then engage in a second phase of the match-identification functionality 300 that involves further evaluating the candidate matches in the initial set using a second comparison technique and thereby determining a final set of candidate matches between customer entries and watchlist entries.

As shown in FIG. 3, this second phase of the match-identification functionality 300 may begin at block 312 with the back-end computing platform 102 determining a group of attribute-level similarity scores for each candidate match in the initial set. This functionality may take any of various forms.

As one possibility, the functionality for determining a group of attribute-level similarity scores for a given candidate match may involve (i) for each selected attribute, determining a respective attribute-level similarity score between the customer entry's attribute value and the watchlist entry's attribute value and (ii) compiling the respective attribute-level similarity scores into a group. The technique for determining attribute-level similarity scores between attribute values may take any of various forms.

As one possibility, the technique for determining attribute-level similarity scores may involve computing a respective edit distance between the customer entry's attribute value and the watchlist entry's attribute value for each selected attribute and then using each selected attribute's respective edit distance as a basis for determining the attribute-level similarity score for the selected attribute (e.g., by using the respective edit distance as an operand in a formula for determining a corresponding attribute-level similarity score). Edit distance is a metric that quantifies the difference between two strings of textual characters in terms of the number of changes it would take to change one of the strings that is being compared into the other. Edit distance can be used many contexts, such as for creating deoxyribonucleic acid (DNA) alignments and for suggesting corrections to misspelled words. However, unmodified edit distances lack a property that is advantageous in the context of the match-identification functionality 300. To illustrate how edit distance lacks this property, consider the following example. If a first edit distance is calculated between two hundred-word paragraphs and a second edit distance is calculated between two five-letter words, the first edit distance is likely to be much larger than the second edit distance even if the percentage of textual characters that are different between the five-letter words is greater than the percentage of textual characters that are different between the hundred-word paragraphs. If six characters differ between the hundred-word paragraphs, it may be reasonable to conclude that the hundred-word paragraphs are very similar to each other. If five characters differ between the five-letter words, it may be reasonable to conclude that the two five-letter words are not very similar to each other. Nevertheless, if a direct comparison between the first edit distance and the second edit distance via a relational mathematical operator (e.g., >, <, =, etc.) is used as the basis for inferring whether the hundred-word paragraphs are more similar to each other than the five-letter words are to each other, an erroneous conclusion is likely to result. Thus, the inequality relationships between the numeric values of edit distances do not imply corresponding relationships between the underlying quality (e.g., similarity) that edit distances are meant to quantify—this is the property that edit distance lacks. In the context of the match-identification functionality 300, it is desirable to be able to infer the relative similarity levels of attribute-level similarity scores based on direct mathematical comparisons.

Therefore, one possible approach for determining an attribute-level similarity score based on edit distance may involve calculating a normalized value based on an edit distance (e.g., determining a quotient by dividing an edit distance by the length (as measured in textual characters) of the longer of the two textual segments whose differences the edit distance quantifies and optionally subtracting the quotient from one).

Regarding how edit distance may be determined, the types of changes that may be used to transform one string into another may involve one or more of (i) substituting one character for another, (ii) deleting one or more characters, (iii) inserting one or more characters, or (iv) transposing one or more characters. Each type of change may be assigned a penalty amount. The penalty amount assigned to different types of changes can vary from one implementation to another and some variations do not allow certain types of changes to be made at all. For example, the Hamming variation of edit distance does not allow insertions or deletions. By contrast, the Longest Common Subsequence variation (LCS) does not allow substitutions. Other variations, such as the Levenshtein variation, do not prohibit any types of changes. Regardless of the implementation, though, the edit distance between two strings is the sum total of the penalty amounts for the individual changes that would be performed in the process of transforming one string into another. Therefore, the edit distance between two identical strings is zero. As the number of differences between two strings increases, the edit distance between those two strings also increases. Thus, a smaller edit distance indicates fewer differences between the strings being compared, while a larger edit distance indicates more differences between those strings.

To further illustrate one out of the many possible forms that calculating the edit distance could take, consider the following illustrative example. First, the back-end computing platform 102 defines a two-dimensional matrix. The number of rows in the matrix equals the number of characters in the first string (e.g., the customer entry's attribute value for the selected attribute) plus one, while the number of columns in the matrix equals the number of characters in the second string (e.g., the watchlist entry's attribute value for the selected attribute) plus one. Both the first row and the first column of the matrix map to an empty string (e.g., a string with no characters). Beginning at the second column, each subsequent column in the matrix maps to a character in the second string. Similarly, beginning at the second row, each subsequent row maps to a character in the first string. Thus, row 1 maps to the first character of the first string, row 2 maps to the second character of the first string, and so on. Similarly, column 1 maps to the first character of the second string, column 2 maps to the second character of the second string, and so on. Thus, the matrix element at the indices (0,0) (where the first number indicates the row of the element and the second number indicates the column of the element) maps to the empty string for both its row and its column. The matrix element at the indices (1,1) maps to both the first character of the first string and the second character of the second string.

Once the matrix is defined, the back-end platform 102 fills in each element of the first (i.e., zeroth) row with a value equal to the penalty for deletion multiplied by the column index of the element. Similarly, the back-end platform 102 fills each element of the first (i.e., zeroth) column with a value equal to the penalty for insertion multiplied by the row index of the element.

Next, the back-end platform 102 calculates the value for each remaining cell in the following manner. First, the back-end platform 102 identifies a target element in the matrix that has not yet been filled in, but that is adjacent to three elements that have been filled in. Let i denote the index of the row of the target element and let j denote the index of the column of the target element such that the indices of the target element may be written as (i, j). The back-end computing platform 102 compares the character to which row i maps to the character to which column j maps. If the characters match, the back-end computing platform 102 fills in the target element with the lesser of (i) the value of the element (i−1, j), (ii) the value of the element (i, j−1), and (iii)

the value of the element (i−1, j−1). If the characters do not match, the back-end computing platform 102 fills in the target element with the sum of (i) the substitution penalty and (ii) the lesser of the values of the elements (i−1, j), (i, j−1), and (i−1, j−1). Note that more than one of the values of the elements (i−1, j), (i, j−1), and (i−1, j−1) may be the lesser value. The back-end platform 102 uses this same approach to fill in the remainder of the elements in the matrix. Given the dependency that the value of each remaining elements has on the neighboring elements that precede it in terms of row and column indices, the last element to be filled in with a value will be the element on the corner diagonally opposite the corner in which the element (0,0) is positioned. The value in this last element is the edit distance between the first string and the second string.

While edit distance is a powerful and useful metric for quantifying differences between strings (e.g., attribute values) and can be used to help calculate an attribute-level similarity score as explained above, generating and filling in a matrix in the manner described above is a technique that runs in polynomial time. In other words, the computational complexity of computing the edit distance between two strings is $O(n \cdot m)$, where n represents the length of the first string and m represents the length of the second string. The number of possible pairings between customer entries and watchlist entries may be relatively large. As a result, if many customers are to be screened against the watchlist, it may be impractical to determine the edit distances between the attribute value for each selected attribute for each possible pairing of a customer entry and a watchlist entry-even with an ample supply of processors and memory. This is one reason why it is advantageous to distill the number of possible pairings between customer entries and watchlist entries down to an initial set of candidate matches beforehand via a similarity score technique (e.g., cosine similarity) that has a lower computational complexity. That way, the number of pairings to which the edit distance technique will be applied will be small enough to make it practical to use the edit distance technique to facilitate identifying true matches with greater accuracy.

As another possibility, the technique for determining attribute-level similarity scores may involve techniques for string comparison other than edit distance. For example, the back-end computing platform 102 may apply token-based distance functions (e.g., Jaccard similarity, Jensen-Shannon distance, etc.), hybrid distance functions (e.g., recursive matching schemes, level two distance functions, etc.), "blocking" or pruning methods, or other techniques to determine attribute-level similarity scores.

To illustrate how attribute-level similarity scores might look in a group, consider the following illustrative example. If (i) a customer entry in a candidate match has a name attribute value of "Mehitable Bennett," a zip code attribute value of "84647-0015", and a social security number attribute of "123-45-6789,"; and (ii) a watchlist entry in the candidate match has a name attribute value of "Mehittabil Bennet," a zip code attribute value of ("84647-1100"), and a social security number attribute of "987-65-4321," Levenshtein distances (which assign a penalty of one for each type of change) between these attribute values could serve as operands in a formula for determining attribute-level similarity scores. The Levenshtein distances would be (i) four for the name values, (ii) four for the zip codes, and (iii) eight for the social security numbers. The back-end computing platform 102 may, for example, determine the respective attribute-level similarity score for each given attribute by computing the respective quotient of the Levenshtein distance for the given attribute and the length of the larger of either (i) the customer entry's value for the given attribute or (ii) the watchlist entry's value for the given attribute, then subtracting the quotient from one. If this approach is used, the attribute-level similarity scores would be (i) six tenths (i.e., 1-4/10) for the name attribute, (ii) six tenths (i.e., 1-4/10) for the zip code attribute, and (iii) three elevenths (i.e., 1⁸⁄₁₁) for the social security number attribute. Thus, the group of attribute-level similarity scores for the candidate match could be stored, for example, as a vector of three elements as (6/10, 6/10, ³⁄₁₁).

At block 314, the back-end computing platform 102 may determine the final set of candidate matches between customer entries and watchlist entries based on the groups of attribute-level similarity scores that are determined for the candidate matches in the initial set. This functionality for determining the final set of candidate matches may take any of various forms.

As one possibility, the back-end computing platform 102 accomplishes this via a trained data science model that receives a group of attribute-level similarity scores as input and outputs a likelihood of match. The back-end computing platform 102 compares the likelihood to a threshold likelihood value that dictates whether or not a candidate match from the initial set is included in the final set.

For example, the data science model may comprise a trained model object (e.g., a trained machine-learning model that may also be called a "regressor") that is configured to receive a given group of attribute-level similarity scores for a given candidate match as input data. The group of attribute-level similarity scores serve as actual parameters that map to respective formal parameters that represent the selected attributes. After receiving the given group as input data, the data science model is configured to evaluate the input data and, based on the evaluation, output the likelihood that the given customer entry and the given watchlist entry in the given candidate match are truly a match. After outputting the likelihood of match, the trained model object may classify the candidate match as a true match if the likelihood is not less than the threshold likelihood value. The platform adds those of the candidate matches that are identified as true matches to the final set.

The trained model object may be generated by applying a machine-learning process to a training dataset. The machine-learning process may comprise any combination of one or more various machine learning techniques, examples of which may include regression techniques (e.g., logistic regression), decision-tree techniques, support vector machine (SVM) techniques, Bayesian techniques, ensemble techniques, gradient descent techniques (e.g., including gradient boosting), and/or neural network techniques, among various other possibilities.

Optionally, the data science model may also apply a technique to the trained model object to quantify the extent to which each attribute of interest influences the determined likelihood of match generally or for a given candidate match. The technique (which may be referred to as an "interpretability" technique or an "explainer" technique) may take various forms. Some examples of explainer techniques include Local Interpretable Model-agnostic Explanations (LIME), plot-based explainer techniques (e.g., Partial Dependence Plots (PDP), Individual Conditional Expectation (ICE) plots, Accumulated Local Effects (ALE), etc.), game-theoretic explainer techniques (e.g., techniques such as KernelSHAP, TreeSHAP, etc. that determine or approximate Shapley values, Owen values, or Banzhaf-Owen values, etc.).

The training dataset may comprise a set of training instances. Each given training instance may represent a candidate match that has a verified label. The verified label indicates whether the given candidate match the training instance represents was found to be a true match by an established verification process. In this example, the given training instance would comprise the group of attribute-level similarity scores for the given candidate match and the verified label. Various forms of established verification processes (e.g., such as manual verification by analysts) may be used to determine the verified labels for the training instances in the training dataset.

As another possibility, the back-end computing platform 102 may determine the final set of candidate matches via a different approach for classifying the candidate matches. For example, a deterministic set of one or more classification rules could be defined by an approach that does not involve model training. The classification rules may take any of various forms. For example, one or more analysts could define the set of classification rules and encode the rules in the back-end computing platform 102 through an interface found on one or more of the client devices 106 shown in FIG. 1. The classification rules may specify one or more conditions which, if satisfied, cause candidate matches to be included in (or excluded from) the final set. The conditions may be defined with respect to the attribute-level similarity scores. To illustrate one example of one way such a rule could be defined, consider the following example: a rule could specify that a candidate match whose group of attribute-level similarity scores sums to a value that exceeds a threshold sum be excluded from the final set. To illustrate another way in which such rules could be defined, consider the following example. A rule could specify separate thresholds for each attribute and indicate that a candidate match having two attribute-level similarity scores that are below their respective thresholds is to be included in the final sets. Many other types of classification rules may also be defined.

Still further, the back-end computing platform 102 may determine the final set of candidate matches some other approach.

At block 316, the back-end computing platform 102 may optionally apply a set of "false positive reduction" rules to the candidate matches included in the final set to identify and remove any candidate matches that were erroneously added to the final set. The false-positive rules may specify one or more conditions that, if satisfied, cause candidate matches to be excluded from or included in the final set. The conditions may be based on one or more of any values associated with the entries in a candidate match, such as attribute-level similarity scores, attribute values or either or both entries in the candidate match, the similarity scores that were determined for the pairing of the entries in the candidate match, or some other value associated with the entries in a candidate match. The false positive reduction rules may take any of various forms.

In one implementation, the back-end computing platform 102 may be configured to apply a false positive reduction rule related to a common surname, such as "Wang," which may be shared by one hundred million people worldwide. For example, the back-end computing platform 102 may be configured to apply a false positive reduction rule for identifying and removing candidate matches that were included in the final set based primarily on similarity of surnames that resemble a common surname (such as "Wang"), such as by specifying that if the candidate match involves a common surname (or a variant thereof) and the influence level (e.g., as determined by an explainer technique applied to the trained model object or by a weight learned by the trained model object for the surname attribute) of the surname attribute meets a threshold influence level, the candidate match is to be removed from the final set.

In another implementation, back-end computing platform 102 may be configured to apply a false positive reduction rule related to measurable differences between attributes that are of ordinal data types. Specifically, in this implementation, the back-end computing platform 102 may calculate a numerical difference between the respective years that are included in birth-date attribute values for the entries in the candidate match. The false positive reduction rule may specify that if the magnitude of the difference between the respective years meets or exceeds a year threshold, the candidate match is to be removed from the final set.

The back-end computing platform 102 may be configured to apply other types of false positive reduction rules as well.

As noted above, although the functionality of FIG. 3 is described in terms of customers, this is merely for purposes of illustration. It should be understood that the same functionality could be carried out for partners and other parties who are to be screened against a watchlist.

Figure 4B:
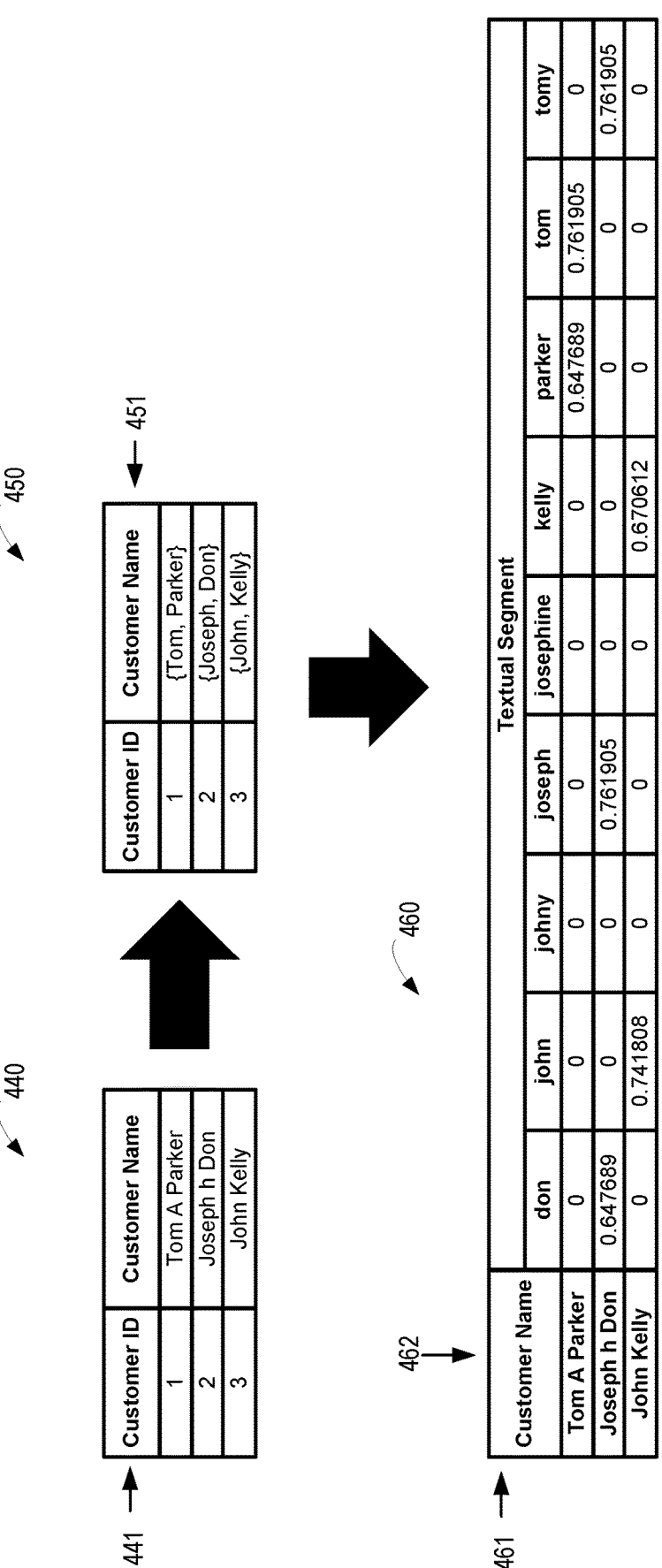

Turning to FIGS. 4A-C, a simplified example is shown to illustrate how an initial set of candidate matches may be identified in accordance with a first phase of the disclosed software technology. The example described with respect to FIGS. 4A-C is merely illustrative. Different types of attributes and different numbers of attributes may be used in other examples. Furthermore, different methodologies may be used to transform textual segments from attribute values and different methodologies may be used to determine similarity scores.

Beginning with FIG. 4A, a table 410 is shown that depicts a simplified watchlist in which each watchlist entry includes an identifier (in the column labeled "Watchlist ID") and a name (in the column labeled "Watchlist Name"). Each row in the table 410 (other than the header row 411) represents a respective watchlist entry. For example, a first watchlist entry includes an identifier value of "1" and a name value of "Tom h Parker," a second watchlist entry includes an identifier value of "2" and a name value of "Tomy Parker," and so forth.

In line with the discussion above, the first phase of the disclosed software technology may involve transforming the name values of the waitlist entries into respective sequences of textual segments. As noted above, there are many different approaches that may be used to transform name values into respective sequences textual segments, and for the purposes of this example, each respective name value in the table 410 is shown as being transformed into a sequence of textual segments using a technique that treats whitespace as a delimiter and excludes middle initials (e.g., single-character textual segments), which results in the sequence of textual segments shown in table 420.

Specifically, in the table 420, each row (other than header row 421) represents one of the watchlist entries shown in the table 410, but the name value of each watchlist entry has been transformed into a sequence of textual segments. For example, the textual segments "{Tom, Parker}" are shown for the watchlist entry with the identifier value of "1," the textual segments "{Tomy, Parker}" are shown for the watchlist entry with the identifier value of "2," and so forth.

In line with the discussion above, the first phase of the disclosed software technology may further involve converting the respective sequences of textual segments for the names of the watchlist entries (and customer entries) into corresponding sequences of numeric values. As noted above, one possible approach for performing this conversion functionality involves learning a vocabulary of unique textual segments from the collection of name values across the watchlist entries, determining IDF values for the learned vocabulary, and then using the learned vocabulary of the collection of name values across the watchlist entries and the corresponding IDF values to determine TF-IDF vectors for both the watchlist entries and the customer entries. The example of FIGS. 4A-4C utilizes this approach to convert the sequences of textual segments in the table 420 into corresponding TF-IDF vectors.

Specifically, a table 430 is shown with a top row 431 that shows a vocabulary that has been learned from the watchlist entries shown in table 410, which is arranged in alphabetical order. Further, each subsequent row of the table 430 represents a TF-IDF vector for a respective watchlist entry, where each such TF-IDF vector comprises an ordered sequence of TF-IDF values for the textual segments in the learned vocabulary. For example, for the watchlist entry with the name value "Josephine h Don," the TF-IDF vector is shown to include a TF-IDF value for the textual segment "don" of "0.647689," a TF-IDF value for the textual segment "josephine" of "0.761905," and TF-IDF values for the other textual segments in the vocabulary (e.g., "john," "johny," "joseph," "kelly," "parker," "tom," and "tomy") that are zero to reflect that those other textual segments are not contained within the name "Josephine h Don." As a result, the TF-IDF vector for the name value "Josephine h Don" is {0.647689, 0, 0, 0.761905, 0, 0, 0, 0, 0}. The TF-IDF vectors for the other watchlist entries have a similar form.

Turning to FIG. 4B, a table 440 is shown that depicts a simplified list of customer to be screened against the simplified watchlist depicted by the table 410 of FIG. 4A. Like the watchlist entries, each customer entry includes an identifier (in the column labeled "Customer ID") and a name (in the column labeled "Customer Name"). Each row in the table 440 (other than the header row 441) represents a customer entry. For example, a first customer entry includes an identifier value of "1" and a name value of "Tom A Parker," a second customer entry includes an identifier value of "2" and a name value of "Joseph h Don," and so forth.

For the purposes of this example, each respective name value in the table 440 is shown as being transformed into a sequence of textual segments using the same example technique applied to the watchlist entries, which treats whitespace as a delimiter and excludes middle initials (e.g., single-character textual segments). This results in the sequence of textual segments shown in table 450.

Specifically, in the table 450, each row (other than the header row 451) represents one of the customer entries shown in the table 440, but the name value of each watchlist entry has been transformed into a sequence of textual segments. For example, the textual segments "{Tom, Parker}" are shown for the customer entry with the identifier value of "1," the textual segments "{Joseph, Don}" are shown for the customer entry with the identifier value of "2," and so forth.

Further, for purposes of this example, the sequences of textual segments in the table 450 have been converted into corresponding TF-IDF vectors using the same learned vocabulary (and the same IDF values) that were determined based on the watchlist entries shown in table 410. Specifically, a table 460 is shown with a top row 461 that shows the same vocabulary that was learned from the watchlist entries shown in table 410, which is arranged in alphabetical order.

Further, each subsequent row of the table 460 represents a TF-IDF vector for a respective customer entry, where each such TF-IDF vector comprises an ordered sequence of TF-IDF values for the textual segments in the learned vocabulary. For example, for the customer entry with the name value "Tom A Parker," the TF-IDF vector is shown to include a TF-IDF value for the textual segment "parker" of "0.647689," a TF-IDF value for the textual segment "tom" of "0.761905," and TF-IDF values for the other textual segments in the vocabulary (e.g., "don," "john," "johny," "joseph," "josephine," "kelly," and "tomy") that are zero to reflect that those other textual segments are not contained within the name "Tom A Parker." As a result, the TF-IDF vector for the name value "Tom A Parker" is {0, 0, 0, 0, 0, 0, 0.647689, 0.761905, 0}. The TF-IDF vectors for the other customer entries have a similar form. (In the example of FIG. 4B, each customer's first and last name are found in the vocabulary learned from the watchlist entries, but it should be understood that in other examples, certain of the customer's first and/or last names may not appear in the learned vocabulary, in which case the TF-IDF vectors for certain customers may contain only one non-zero TF-IDF value or perhaps no non-zero TF-IDF values).

As described above, after the TF-IDF vectors have been determined for the watchlist entries and the customer entries, those TF-IDF vectors can then be used to determine a respective similarity score can for each possible pairing between a customer entry and a watchlist entry. This functionality may take any of the various forms described above, including but not limited to functionality that utilizes a technique such as cosine similarity to determine similarity scores between TF-IDF vectors having the same length and ordering.

For instance, turning to FIG. 4C, a table 470 is shown that depicts similarity scores for possible pairings of the customer entries shown in the table 440 and the watchlist entries shown in the table 410. In the table 470, the name values for customer entries are listed in the header column 472 and the name values for watchlist entries are listed in the header row 471, and each respective numeric entry represents a similarity score for the pairing of (i) the customer entry indicated in the respective numeric entry's row in the header column 472 and (ii) the watchlist entry indicated in the respective numeric entry's column in the header row 471. The similarity scores in the table 470 are shown in matrix form for illustrative purposes, but it should be understood that the similarity scores may be represented and stored in various other forms as well.

In this example, a value of "1" represents the upper bound of the range of values that a similarity score may have, and a value of "0" represents the lower bound of the range of values that a similarity score may have. For example, the similarity score between the customer entry with the name value "Tom A Parker" and the watchlist entry with the name value "Tom h Parker" is shown to be "1," which indicates a maximum level of similarity due to the fact that the sequence of textual segments transformed from "Tom A Parker" ("{Tom, Parker}," as shown in the table 450 of FIG. 4B) and the sequence textual segments transformed from "Tom h Parker" ("{Tom, Parker}," as shown in the table 420 of FIG. 4A) were converted into identical TF-IDF vectors. As another example, the similarity score between the customer entry with the name value "Tom A Parker" and the watchlist entry with the name value "Josephine h Don" is shown to be "0," which indicates a minimum level of similarity due to the fact that the sequence of the textual segments transformed from "Tom h Parker" and the sequence of textual segments transformed from "Josephine h Don" were converted into TF-IDF vectors that did not have similarity in any dimension of the learned vocabulary. As yet another example, the similarity score between the customer entry "John Kelly" and the watchlist entry "Johny Kelly" is shown to be "0.317189," which indicates an intermediate level of similarity due to the fact that the entries have the same last name but differing first names.

As described above, after the similarity scores are determined for the possible pairings between customer and watchlist entries, those similarity scores may then be used as a basis for determining candidate matches between customer entries and watchlist entries that are to be added to the initial set of candidate matches. This functionality may take any of the various forms described above, including but not limited to functionality that utilizes threshold-based and/or ranking-based approaches. For instance, consider an example in which a threshold similarity score of 0.9 is used to determine candidate matches. In this example, candidate matches between the customer entries depicted in the table 440 and watchlist entries depicted by the table 410 may be determined by identifying any pairings in the table 470 having similarity scores greater than or equal to 0.9. However, it should be understood that the determination of the candidate matches based on the similarity scores may take other forms as well.

Figure 5:
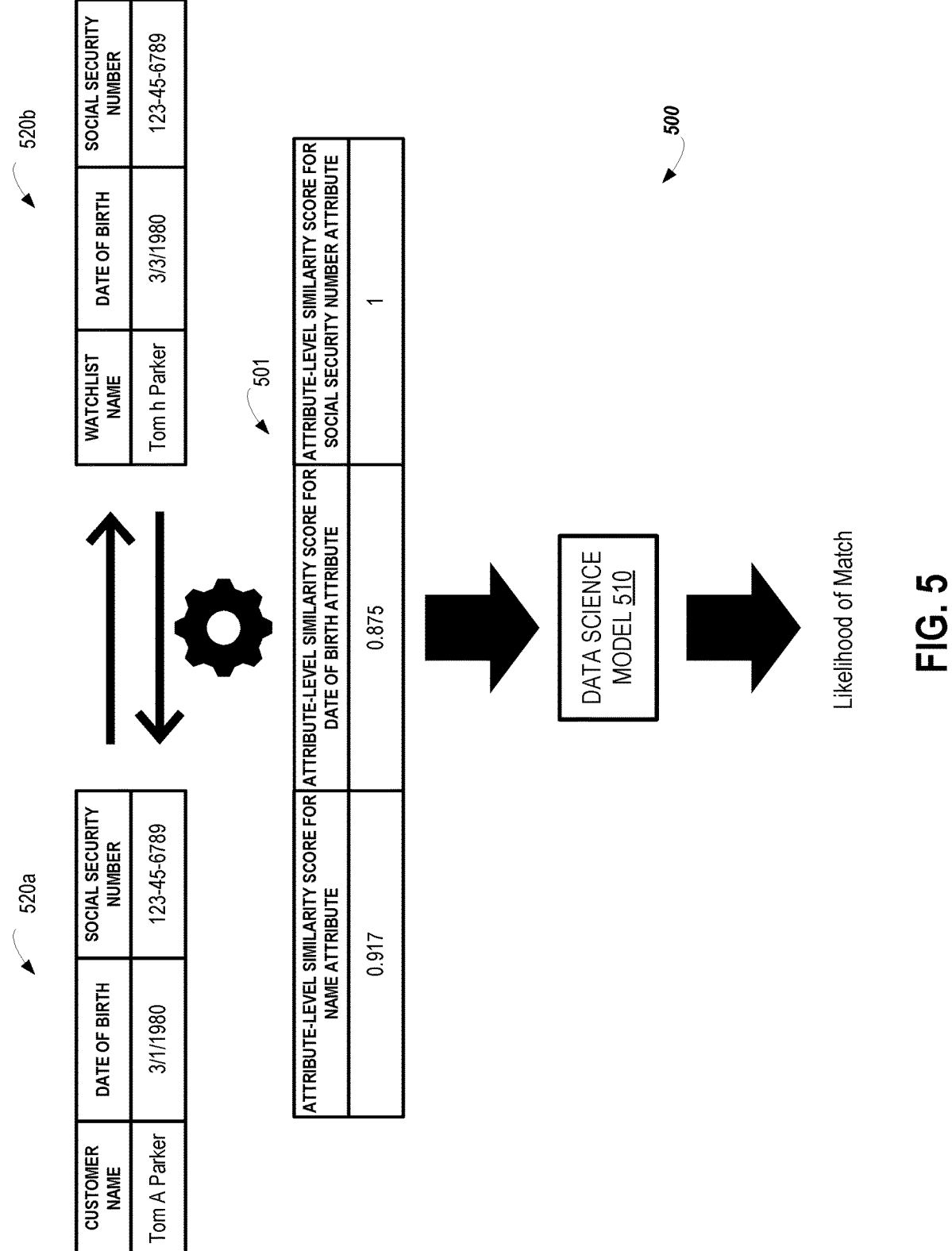
FIG. 5 illustrates a simplified example of how a candidate match between an example customer entry and an example watchlist entry may be evaluated in accordance with a second phase of the disclosed software technology.

The candidate matches that are determined based on the functionality of FIGS. 4A-4C may then be further evaluated during a second phase of the disclosed software technology. To demonstrate, FIG. 5 illustrates a simplified example of how a candidate match between the customer entry with the name value "Tom A Parker" (depicted by the table 440 of FIG. 4B, but with values for the additional attributes "date of birth" and "social security number" added as shown in the table 520a) and the watchlist entry with the name value "Tom h Parker" (depicted by the table 410 of FIG. 4A, but with values for the additional attributes "date of birth" and "social security number" added as shown in the table 520b) may be evaluated in accordance with the second phase of the disclosed software technology.

In this example, suppose the back-end computing platform 102 applies an edit-distance technique to determine the respective edit distances between the values shown in the tables 520a, 520b ("Tom A Parker" is compared to "Tom H Parker," "Mar. 1, 1980" is compared to "Mar. 3, 1980," and "123-45-6789" is compared to "123-45-6789"). The table 501 shows the respective attribute-level similarity scores that have been computed based on the edit distances between the values "Tom A Parker" and "Tom H Parker," "Mar. 1, 1980" and "Mar. 3, 1980," and "123-45-6789" and "123-45-6789," respectively. In this example, Levenshtein distance is the type of edit distance determined. However, other edit-distance techniques (e.g., that use different values for penalty parameters) could also be used in other examples.

The back-end computing platform 102 can calculate the attribute-level similarity scores shown in the table 501 for the attributes based on the edit distances for those attributes, respectively. The manner in which the back-end computing platform 102 calculates the attribute-level similarity scores for the attributes shown may take any of various forms.

As one possibility, the back-end computing platform 102, for each given attribute, the back-end computing platform 102 determines (i) the length of the value for the given attribute (e.g., the name value) for the customer entry and (ii) the length of the value for the given attribute (e.g., the name value) for the watchlist entry. The respective length of the respective value for the respective entry may be quantified, for example, by the number of textual characters appearing in the respective value. Next, the back-end computing platform 102 compares the respective lengths (e.g., the length of the customer entry's name value and the length watchlist entry's name value) and designates the larger of the two respective lengths as a divisor for a quotient. (If the respective lengths are equal, as is the case in this example, then either of the respective lengths is designated as the divisor.) Furthermore, the back-end computing platform 102 designates the edit distance for the given attribute (e.g., name) as the dividend for the quotient. To calculate the attribute-level similarity score for the given attribute, the back-end computing platform 102 computes the quotient and then subtracts the quotient from one. In the example shown in FIG. 5, the edit distance for the name attribute is one (because there is a single-character difference between the name values being compared). As a result, the dividend (which is the edit distance, in this example) is one and the divisor (the length of the values for the name attribute) is twelve (whitespace characters are included in the length). The quotient for the name attribute is therefore one twelfth, which results in an attribute-level similarity score of eleven twelfths (i.e., one minus one twelfth) for the name attribute (which is approximately 0.917 in decimal form). Similarly, the edit distance for the date of birth attribute is one and the length of either date of birth value is eight, so the quotient for the date of birth attribute is one eighth, which results in an attribute-level similarity score of seven eighths for the date of birth attribute (which is 0.875 in decimal form). Since the edit distance between the values for the social security number attribute is zero, the quotient for the social security number attribute is zero, which results in a similarity score of one for the social security number attribute (because one minus zero is one).

The manner in which the back-end computing platform 102 calculates the attribute-level similarity scores may take other forms. For example, the edit distance itself could be used as an attribute-level similarity score. However, the approach of subtracting the quotient from one as described above has an advantageous normalizing effect such that the resulting attribute-level similarity scores can represent similarity as a percentage of the length of the longer attribute value. Without this normalizing effect, it would be difficult for the data science model 510 to infer how similar two attribute values truly are. For example, if the edit distance between two attribute values that are a hundred characters long is ten and the edit distance between two attribute values that are one character long is one, the attribute values that are one character long may appear to be more similar due to their smaller edit distance-even though the one-character attribute values literally have no characters in common.

Returning to FIG. 5, the back-end computing platform 102 provides the attribute-level similarity scores for the name attribute, the date of birth attribute, and the social security number attribute as input (e.g., as an instance) to the data science model 510. The data science model 510 outputs a likelihood of match for the customer entry with the name value "Tom A Parker" (depicted by the table 520a) and the watchlist entry with the name value "Tom h Parker" (depicted by the table 520b). The data-science model 510 may take any of various forms.

As one possibility, consider an example in which the data science model 510 is a perceptron. In this example, the data science model 510 determines a group of products by multiplying each attribute-level similarity score by a respective weight that the data science model 510 learned as a result of being trained against a set of training data beforehand. (The example described with respect to FIG. 5 uses three attribute-level similarity scores for the sake of simplicity in illustration, but greater or lesser numbers of attribute-level similarity scores for different attributes may be used in other examples.) The group of products also includes a product that the data science model 510 determined by multiplying a constant value by a corresponding weight that was learned via the training. In this simple example, the data science model 510 outputs the sum of the products in the group. As noted above with respect to FIG. 3, many different types of data science models may be used in different examples. A perceptron is described in this example for the sake of simplicity. However, given that perceptrons lack the capacity to produce nonlinear solutions, it may be desirable to use more powerful data science models that can produce nonlinear solutions.

As another possibility, the data science model 510 may be a logistic regression model. In this example, the data science model 510 learns respective weights for the attribute-level similarity scores and inserts them as parameters into logistic function to determine the likelihood of match for the customer entry with the name value "Tom A Parker" and the watchlist entry with the name value "Tom h Parker."

Figure 6:
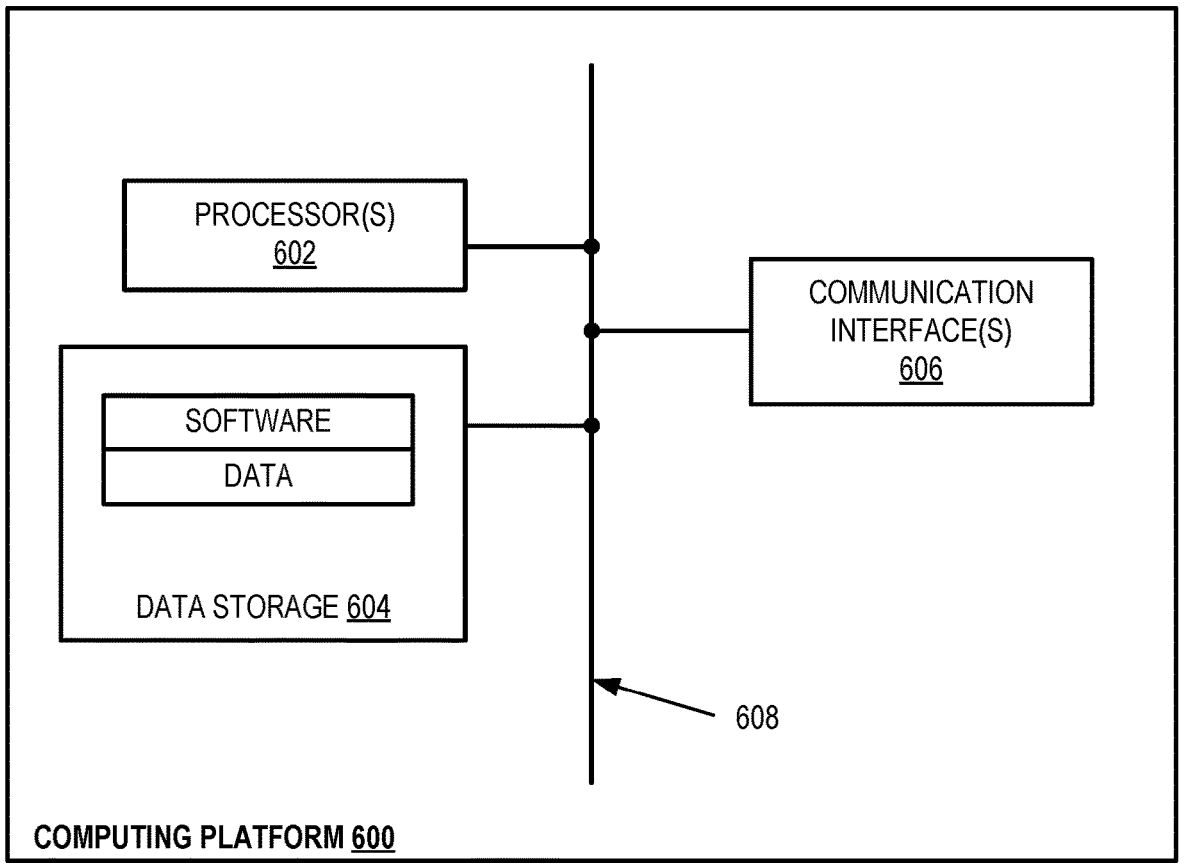
FIG. 6 depicts a simplified block diagram to illustrate some structural components that may be included in an example computing platform that may be configured to perform some or all of the platform functions disclosed herein.

Turning now to FIG. 6, a simplified block diagram is provided to illustrate some structural components that may be included in an example computing platform 600 that may be configured to perform some or all of the platform functions disclosed herein. At a high level, the example computing platform 600 may generally comprise any one or more computer systems (e.g., one or more servers) that collectively include one or more processors 602, data storage 604, and one or more communication interfaces 606, all of which may be communicatively linked by a communication link 608 that may take the form of a system bus, a communication network such as a public, private, or hybrid cloud, or some other connection mechanism. Each of these components may take various forms.

For instance, the one or more processors 602 may comprise one or more processor components, such as one or more central processing units (CPUs), graphics processing unit (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, the data storage 604 may be capable of storing both (i) program instructions that are executable by the one or more processors 602 such that the example computing platform 600 is configured to perform any of the various functions disclosed herein (including but not limited to any of the platform functions discussed above), and (ii) data that may be received, derived, or otherwise stored by the example computing platform 600.

The one or more communication interfaces 606 may comprise one or more interfaces that facilitate communication between the example computing platform 600 and other systems or devices, where each such interface may be wired and/or wireless and may communicate according to any of various communication protocols. As examples, the one or more communication interfaces 606 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 600 may additionally have an I/O interface that includes or provides connectivity to I/O components that facilitate user interaction with the example computing platform 600, such as a keyboard, a mouse, a trackpad, a display screen, a touch-sensitive interface, a stylus, a virtual-reality headset, and/or one or more speaker components, among other possibilities.

It should be understood that the example computing platform 600 is one example of a computing platform that may be used with the embodiments described herein. Numerous other arrangements are possible and contemplated herein. For instance, in other embodiments, the example computing platform 600 may include additional components not pictured and/or more or less of the pictured components.

Figure 7:
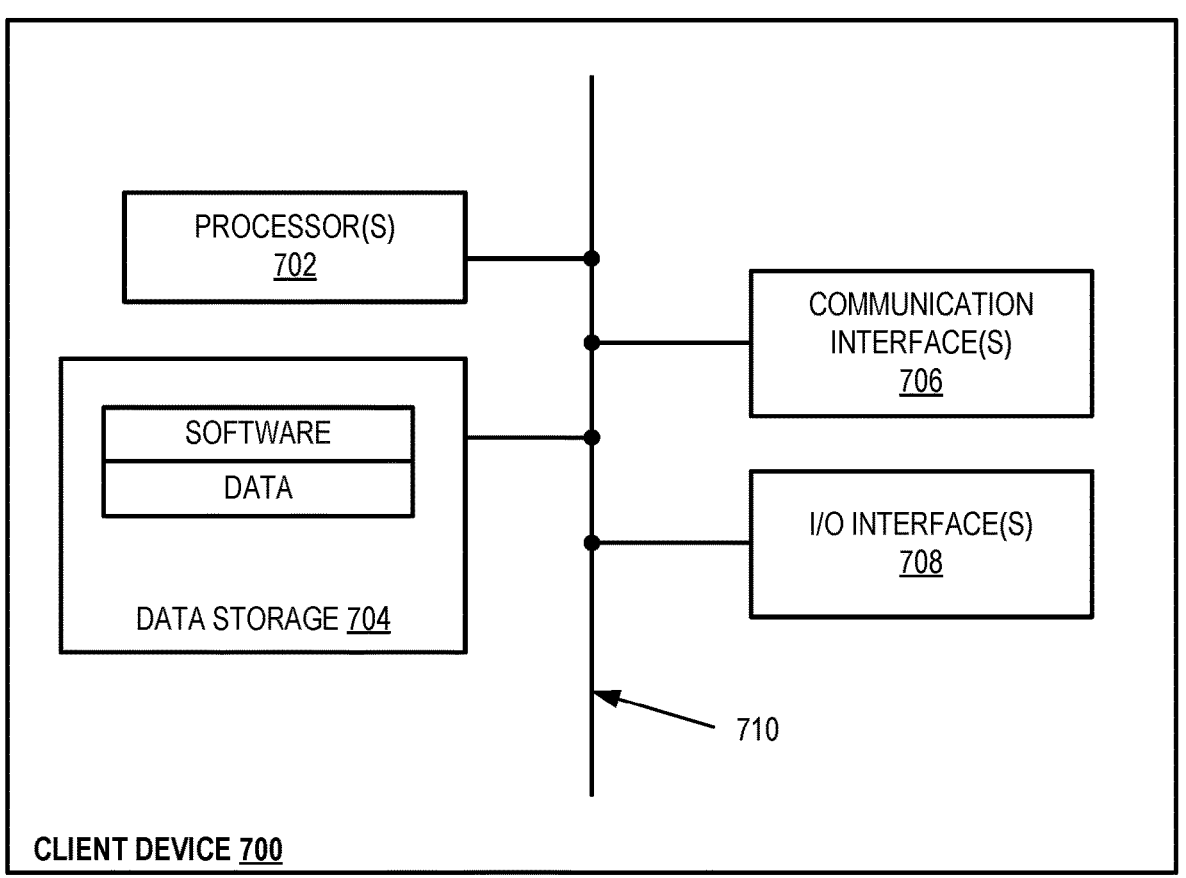
FIG. 7 depicts a simplified block diagram to illustrate some structural components that may be included in an example client device that may be configured to perform some or all of the client-device functions disclosed herein.

Turning next to FIG. 7, a simplified block diagram is provided to illustrate some structural components that may be included in an example client device 700 that may be configured to perform some or all of the client-device functions disclosed herein. At a high level, the example client device 700 may include one or more processors 702, data storage 704, one or more communication interfaces 706, and an I/O interface 708, all of which may be communicatively linked by a communication link 710 that may take the form a system bus and/or some other connection mechanism. Each of these components may take various forms.

For instance, the one or more processors 702 of the example client device 700 may comprise one or more processor components, such as one or more CPUs, GPUs, ASICs, DSPs, and/or programmable logic devices such as FPGAs, among other possible types of processing components.

In turn, the data storage 704 of the example client device 700 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 7, the data storage 704 may be capable of storing both (i) program instructions that are executable by the one or more processors 702 of the example client device 700 such that the example client device 700 is configured to perform any of the various functions disclosed herein (including but not limited to any of the client-device functions discussed above), and (ii) data that may be received, derived, or otherwise stored by the example client device 700.

The one or more communication interfaces 706 may comprise one or more interfaces that facilitate communication between the example client device 700 and other systems or devices, where each such interface may be wired and/or wireless and may communicate according to any of various communication protocols. As examples, the one or more communication interfaces 706 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 708 may generally take the form of (i) one or more input interfaces that are configured to receive and/or capture information at the example client device 700 and (ii) one or more output interfaces that are configured to output information from the example client device 700 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 708 may include or provide connectivity to output components such as a display screen and/or an audio speaker, among other possibilities.

It should be understood that the example client device 700 is one example of a client device that may be used with the example embodiments described herein. Numerous other arrangements are possible and contemplated herein. For instance, in other embodiments, the example client device 700 may include additional components not pictured and/or more or fewer of the pictured components.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

We claim:
1. A computing platform comprising:
   at least one communication interface;
   at least one processor;
   at least one non-transitory computer-readable medium; and
   program instructions stored on the at least one non-transitory computer-readable medium that, when executed by the at least one processor, cause the computing platform to:
      obtain (i) a first set of watchlist data entries for parties that appear on one or more watchlists and (ii) a second set of screened data entries for parties that are to be screened against the one or more watchlists;

determine an initial set of candidate matches between screened data entries and watchlist data entries utilizing a first comparison technique that involves:

transforming a respective attribute value of each watchlist data entry in the first set and each screened data entry in the second set into a respective sequence of textual segments that represents the respective attribute value;

utilizing a vectorization technique to convert the respective sequence of textual segments for each watchlist data entry in the first set and each screened data entry in the second set into a corresponding sequence of numeric values;

for each respective pairing of a respective screened data entry and a respective watchlist data entry in a set of possible pairings between screened data entries and watchlist data entries, determining a respective similarity score of a first type for the respective pairing by evaluating a vector-level similarity between the corresponding sequence of numeric values for the respective screened data entry and the corresponding sequence of numeric values for the respective watchlist data entry; and based on the respective similarity scores of the first type that are determined for the respective pairings in the set of possible pairings, determining a subset of respective pairings to include in the initial set of candidate matches;

after determining the initial set of candidate matches, determine a narrowed set of candidate matches between screened data entries and watchlist data entries utilizing a second comparison technique that is more computationally intensive but less likely to result in false-positive candidate matches than the first comparison technique, wherein the second comparison technique involves:

for each respective candidate match in the initial set, determining a respective group of attribute-level similarity scores of a second type for a group of attributes by evaluating, for each individual attribute in the group of attributes, an attribute-level string similarity between (i) a first attribute value for the individual attribute that is contained within the watchlist data entry and (ii) a second attribute value for the individual attribute that is contained within the screened data entry; and based on the respective groups of attribute-level similarity scores of the second type that are determined for the candidate matches in the initial set, determining a subset of the candidate matches in the initial set to include in the narrowed set of candidate matches; and validate whether the narrowed set of candidate matches are true matches by:

causing given ones of candidate matches in the narrowed set to be presented, via a user interface, to one or more analysts for further evaluation;

receiving user input provided by the one or more analysts that indicates whether the given ones of candidate matches in the narrowed set are true matches; and validating whether the given ones of candidate matches in the narrowed set are true matches based on the user input.

2. The computing platform of claim 1, further comprising program instructions stored on the at least one non-transitory computer-readable medium that, when executed by the at least one processor, cause the computing platform to:

based on validating that a given candidate match in the narrowed set is a true match, suspend an ability of a screened party associated with the given candidate match to engage in certain types of financial transactions.

3. The computing platform of claim 1, wherein the vector-level similarity comprises cosine similarity.

4. The computing platform of claim 1, wherein the attribute-level string similarity comprises edit distance.

5. The computing platform of claim 1, wherein determining the subset of the candidate matches in the initial set to include in the narrowed set of candidate matches based on the respective groups of attribute-level similarity scores of the second type that are determined for the candidate matches in the initial set comprises:

for each candidate match in the initial set, inputting the respective group of attribute-level similarity scores of the second type into a machine learning model that is configured to predict a likelihood of match between a screened data entry and a watchlist data entry and thereby determine a respective likelihood of match for the candidate match; and based on the respective likelihoods of match that are determined for the candidate matches in the initial set, determining the subset of the candidate matches in the initial set to include in the narrowed set of candidate matches.

6. The computing platform of claim 1, wherein the respective attribute value comprises a respective name value.

7. The computing platform of claim 1, wherein the numeric values comprise Term Frequency-Inverse Document Frequency (TF-IDF) values.

8. A non-transitory computer-readable medium, wherein the non-transitory computer-readable medium is provisioned with program instructions that, when executed by at least one processor, cause a computing platform to:

obtain (i) a first set of watchlist data entries for parties that appear on one or more watchlists and (ii) a second set of screened data entries for parties that are to be screened against the one or more watchlists;

determine an initial set of candidate matches between screened data entries and watchlist data entries utilizing a first comparison technique that involves:

transforming a respective attribute value of each watchlist data entry in the first set and each screened data entry in the second set into a respective sequence of textual segments that represents the respective attribute value;

utilizing a vectorization technique to convert the respective sequence of textual segments for each watchlist data entry in the first set and each screened data entry in the second set into a corresponding sequence of numeric values;

for each respective pairing of a respective screened data entry and a respective watchlist data entry in a set of possible pairings between screened data entries and watchlist data entries, determining a respective similarity score of a first type for the respective pairing by evaluating a vector-level similarity between the corresponding sequence of numeric values for the respective screened data entry and the corresponding sequence of numeric values for the respective watchlist data entry; and based on the respective similarity scores of the first type that are determined for the respective pairings in the set of possible pairings, determining a subset of respective pairings to include in the initial set of candidate matches;

after determining the initial set of candidate matches, determine a narrowed set of candidate matches between screened data entries and watchlist data entries utilizing a second comparison technique that is more computationally intensive but less likely to result in false-positive candidate matches than the first comparison technique, wherein the second comparison technique involves:

for each respective candidate match in the initial set, determining a respective group of attribute-level similarity scores of a second type for a group of attributes by evaluating, for each individual attribute in the group of attributes, an attribute-level string similarity between (i) a first attribute value for the individual attribute that is contained within the watchlist data entry and (ii) a second attribute value for the individual attribute that is contained within the screened data entry; and based on the respective groups of attribute-level similarity scores of the second type that are determined for the candidate matches in the initial set, determining a subset of the candidate matches in the initial set to include in the narrowed set of candidate matches; and validate whether the narrowed set of candidate matches are true matches by:

causing given ones of candidate matches in the narrowed set to be presented, via a user interface, to one or more analysts for further evaluation;

receiving user input provided by the one or more analysts that indicates whether the given ones of candidate matches in the narrowed set are true matches; and validating whether the given ones of candidate matches in the narrowed set are true matches based on the user input.

9. The non-transitory computer-readable medium of claim 8, further provisioned with program instructions that, when executed by the at least one processor, cause the computing platform to:

based on validating that a given candidate match in the narrowed set is a true match, suspend an ability of a screened party associated with the given candidate match to engage in certain types of financial transactions.

10. The non-transitory computer-readable medium of claim 8, wherein the vector-level similarity comprises cosine similarity.

11. The non-transitory computer-readable medium of claim 8, wherein the attribute-level string similarity comprises edit distance.

12. The non-transitory computer-readable medium of claim 8, wherein determining the subset of the candidate matches in the initial set to include in the narrowed set of candidate matches based on the respective groups of attribute-level similarity scores of the second type that are determined for the candidate matches in the initial set comprises:

for each candidate match in the initial set, inputting the respective group of attribute-level similarity scores of the second type into a machine learning model that is configured to predict a likelihood of match between a screened data entry and a watchlist data entry and thereby determine a respective likelihood of match for the candidate match; and based on the respective likelihoods of match that are determined for the candidate matches in the initial set, determining the subset of the candidate matches in the initial set to include in the narrowed set of candidate matches.

13. A method carried out by a computing platform, the method comprising:

obtaining (i) a first set of watchlist data entries for parties that appear on one or more watchlists and (ii) a second set of screened data entries for parties that are to be screened against the one or more watchlists;

determining an initial set of candidate matches between screened data entries and watchlist data entries utilizing a first comparison technique that involves:

transforming a respective attribute value of each watchlist data entry in the first set and each screened data entry in the second set into a respective sequence of textual segments that represents the respective attribute value;

utilizing a vectorization technique to convert the respective sequence of textual segments for each watchlist data entry in the first set and each screened data entry in the second set into a corresponding sequence of numeric values;

for each respective pairing of a respective screened data entry and a respective watchlist data entry in a set of possible pairings between screened data entries and watchlist data entries, determining a respective similarity score of a first type for the respective pairing by evaluating a vector-level similarity between the corresponding sequence of numeric values for the respective screened data entry and the corresponding sequence of numeric values for the respective watchlist data entry; and based on the respective similarity scores of the first type that are determined for the respective pairings in the set of possible pairings, determining a subset of respective pairings to include in the initial set of candidate matches;

after determining the initial set of candidate matches, determining a narrowed set of candidate matches between screened data entries and watchlist data entries utilizing a second comparison technique that is more computationally intensive but less likely to result in false-positive candidate matches than the first comparison technique, wherein the second comparison technique involves:

for each respective candidate match in the initial set, determining a respective group of attribute-level similarity scores of a second type for a group of attributes by evaluating, for each individual attribute in the group of attributes, an attribute-level string similarity between (i) a first attribute value for the individual attribute that is contained within the watchlist data entry and (ii) a second attribute value for the individual attribute that is contained within the screened data entry; and based on the respective groups of attribute-level similarity scores of the second type that are determined for the candidate matches in the initial set, determining a subset of the candidate matches in the initial set to include in the narrowed set of candidate matches; and validating whether the narrowed set of candidate matches are true matches by:

causing given ones of candidate matches in the narrowed set to be presented, via a user interface, to one or more analysts for further evaluation;

receiving user input provided by the one or more analysts that indicates whether the given ones of candidate matches in the narrowed set are true matches; and validating whether the given ones of candidate matches in the narrowed set are true matches based on the user input.

14. The method of claim 13, wherein the vector-level similarity comprises cosine similarity.

15. The method of claim 13, wherein the attribute-level string similarity comprises edit distance.

16. The method of claim 13, wherein determining the subset of the candidate matches in the initial set to include in the narrowed set of candidate matches based on the respective groups of attribute-level similarity scores of the second type that are determined for the candidate matches in the initial set comprises:

for each candidate match in the initial set, inputting the respective group of attribute-level similarity scores of the second type into a machine learning model that is configured to predict a likelihood of match between a screened data entry and a watchlist data entry and thereby determine a respective likelihood of match for the candidate match; and based on the respective likelihoods of match that are determined for the candidate matches in the initial set, determining the subset of the candidate matches in the initial set to include in the narrowed set of candidate matches.

17. The method of claim 13, further comprising:

based on validating that a given candidate match in the narrowed set is a true match, suspending an ability of a screened party associated with the given candidate match to engage in certain types of financial transactions.

18. The method of claim 13, wherein the respective attribute value comprises a respective name value.

19. The method of claim 13, wherein the numeric values comprise Term Frequency-Inverse Document Frequency (TF-IDF) values.

\* \* \* \* \*